(12) United States Patent
Sano

(10) Patent No.: US 8,543,296 B2
(45) Date of Patent: Sep. 24, 2013

(54) TURNING DRIVE CONTROL UNIT AND CONSTRUCTION MACHINE INCLUDING SAME

(75) Inventor: Kiminori Sano, Chiba (JP)

(73) Assignees: Sumitomo(S.H.I.) Construction Machinery Co., Ltd., Tokyo (JP); Sumitomo Heavy Industries, Ltd., Tokyo (JP)

( * ) Notice: Subject to any disclaimer, the term of this patent is extended or adjusted under 35 U.S.C. 154(b) by 451 days.

(21) Appl. No.: 12/994,551

(22) PCT Filed: May 27, 2008

(86) PCT No.: PCT/JP2008/059742
§ 371 (c)(1),
(2), (4) Date: Nov. 24, 2010

(87) PCT Pub. No.: WO2009/144782
PCT Pub. Date: Dec. 3, 2009

(65) Prior Publication Data
US 2011/0077825 A1    Mar. 31, 2011

(51) Int. Cl.
*G05D 1/00* (2006.01)
*G06F 7/00* (2006.01)

(52) U.S. Cl.
USPC .................................................. 701/42; 701/1

(58) Field of Classification Search
USPC ............... 701/1, 42; 318/139, 162; 417/44.1
See application file for complete search history.

(56) References Cited

U.S. PATENT DOCUMENTS

| 6,092,789 | A  | * | 7/2000 | Christopher et al. | 254/274 |
|---|---|---|---|---|---|
| 7,067,999 | B2 | * | 6/2006 | Sugano et al. | 318/372 |
| 7,345,441 | B2 | * | 3/2008 | Yoshimatsu | 318/372 |
| 7,615,960 | B2 | * | 11/2009 | Morinaga et al. | 318/609 |
| 7,659,677 | B2 | * | 2/2010 | Yoshimatsu et al. | 318/371 |
| 8,000,862 | B2 | * | 8/2011 | Morinaga et al. | 701/50 |
| 2005/0253542 | A1 | * | 11/2005 | Sugano et al. | 318/371 |
| 2007/0229007 | A1 | * | 10/2007 | Morinaga | 318/268 |
| 2008/0036415 | A1 | * | 2/2008 | Kaizuka et al. | 318/730 |

FOREIGN PATENT DOCUMENTS

| JP | 62-13619 | 1/1987 |
|---|---|---|
| JP | 62-16160 | 1/1987 |
| JP | 02-261908 | 10/1990 |
| JP | 2004-36303 | 2/2004 |
| JP | 2006-112114 | 4/2006 |

* cited by examiner

*Primary Examiner* — Ian Jen
(74) *Attorney, Agent, or Firm* — IPUSA, PLLC

(57) ABSTRACT

A turning drive control unit configured to control driving of the rotation mechanism of a construction machine driven to turn by an electric motor includes a drive command output part configured to output a speed command driving the electric motor based on the amount of operation input via the operation part of the construction machine; a rotation speed detection part configured to detect the rotation speed of the electric motor; and a drive command generation part configured to generate a drive command driving the electric motor based on the speed command output from the speed command output part and the rotation speed detected by the rotation speed detection part. At a time immediately before a rotation stop of the electric motor, the drive command generation part causes the braking torque of the electric motor to be smaller than before the time immediately before the rotation stop.

10 Claims, 14 Drawing Sheets

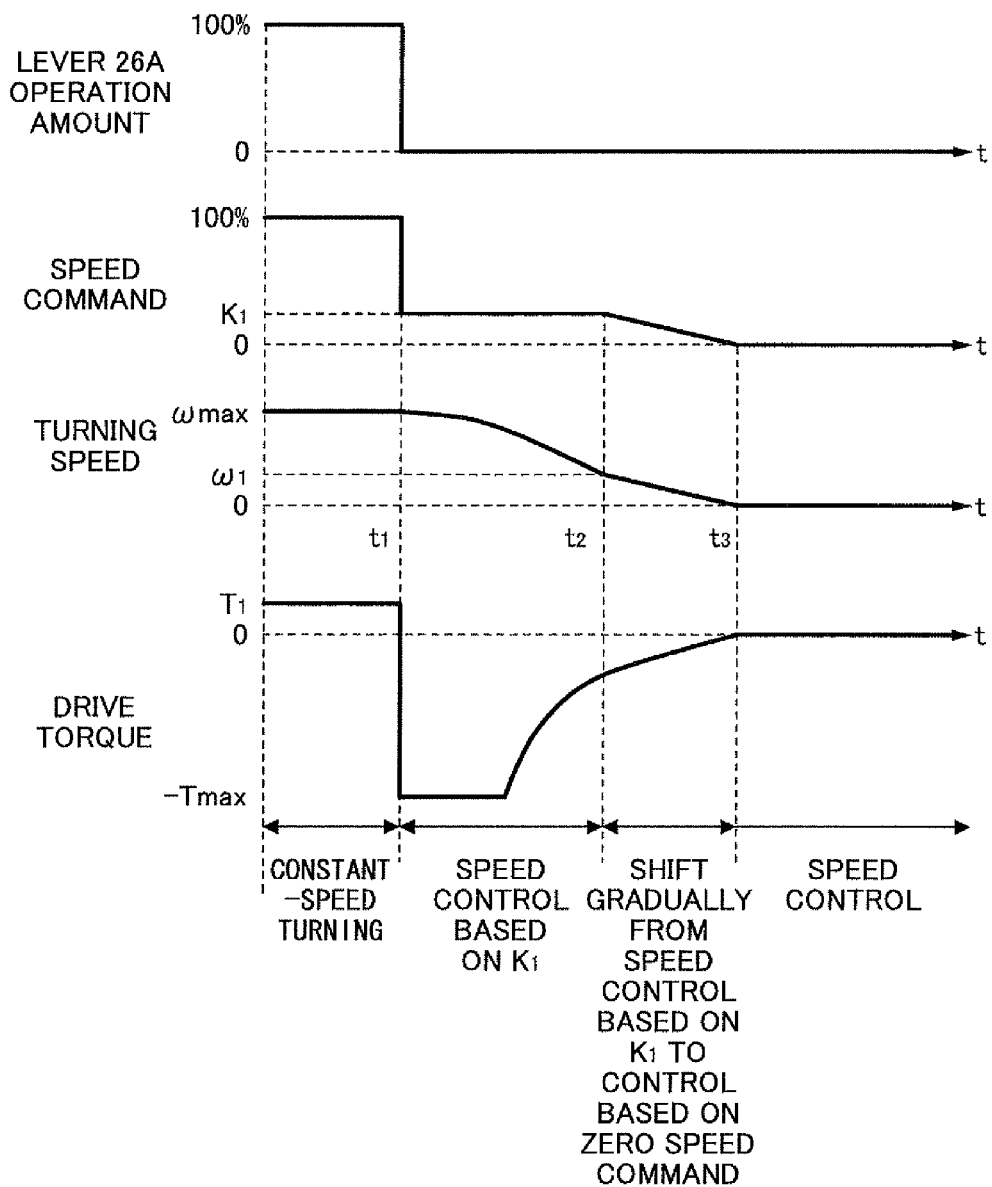

TURNING DRIVE CONTROL UNIT AND CONSTRUCTION MACHINE INCLUDING SAME

TECHNICAL FIELD

The present invention relates to a turning drive control unit configured to control the driving of the turning mechanism of a construction machine and to a construction machine including the same.

BACKGROUND ART

Conventionally, a construction machine has been proposed that has an electric motor as a power source for a turning mechanism for turning an upper-part turning body. In such a construction machine, the turning mechanism is accelerated (driven) by the power running operation of the electric motor, while a regenerative operation is performed at the time of decelerating (braking) the turning mechanism to charge a battery with generated electric power (for example, Patent Document 1). Further, the construction machine described in Patent Document 1 has a hydraulic pump in order to hydraulically drive other drive mechanisms than the turning mechanism, and has a generator connected via a speed-increasing machine to an engine for driving this hydraulic pump, so as to use the electric power produced by power generation to charge the battery and to drive the electric motor of the turning mechanism.

[Patent Document 1] Japanese Laid-Open Patent Application No. 2004-036303

DISCLOSURE OF THE INVENTION

Problems to be Solved by the Invention

In the case of stopping the electric motor for driving the turning mechanism of the upper-part turning body in a driven state, if the electric motor is stopped in a state with a large braking torque, impact due to the backlash of gears of the turning mechanism may be caused.

The occurrence of teeth hitting due to such backlash causes a large impact to be transmitted to the upper-part turning body, thus causing a problem in that a smooth stop is prevented to degrade ride quality. Further, there is a problem in that the continuation of teeth hitting due to backlash damages gears of the turning mechanism.

The present invention has an object of providing a turning drive control unit that makes ride quality good at a turning stop time and enables a construction machine to have a longer useful service life, and a construction machine including the same.

Means for Solving the Problems

A turning drive control unit according to one aspect of the present invention, which is configured to control driving of a rotation mechanism of a construction machine driven to turn by an electric motor, includes a speed command output part configured to output a speed command driving the electric motor based on an amount of operation input via an operation part of the construction machine; a rotation speed detection part configured to detect a rotation speed of the electric motor; and a drive command generation part configured to generate a drive command driving the electric motor based on the speed command output from the speed command output part and the rotation speed detected by the rotation speed detection part, wherein at a time immediately before a rotation stop of the electric motor, the drive command generation part causes a braking torque of the electric motor to be smaller than before the time immediately before the rotation stop of the electric motor.

In addition, the turning drive control unit may further include an operation control part configured to switch the electric motor to a short-circuited state, wherein at the time immediately before the rotation stop of the electric motor, the operation control part may cause the braking torque of the electric motor to be smaller than before the time immediately before the rotation stop of the electric motor by switching the electric motor to the short-circuited state.

In addition, the operation control part may be configured to cancel the short-circuited state of the electric motor when the rotation speed detected by the rotation speed detection part becomes zero, and the drive command generation part may control driving of the electric motor based on a zero speed command causing the rotation speed of the electric motor to be zero when the short-circuited state is canceled by the operation control part.

In addition, the turning drive control unit may further include a drive control stop part configured to stop controlling driving of the electric motor, wherein at the time immediately before the rotation stop of the electric motor, the braking torque of the electric motor may be caused to be smaller than before the time immediately before the rotation stop of the electric motor by the drive control stop part stopping controlling the driving of the electric motor.

In addition, wherein the drive control stop part may be configured to cancel a stopped state of controlling the driving when the rotation speed detected by the rotation speed detection part becomes zero, and the drive command generation part may control the driving of the electric motor based on a zero speed command causing the rotation speed of the electric motor to be zero when the rotation speed detected by the rotation speed detection part becomes zero.

In addition, the turning drive control unit may further include a limiting part configured to limit a value of the drive command in absolute value so that a drive torque generated in the electric motor by the drive command is less than or equal to an allowable value, wherein at the time immediately before the rotation stop of the electric motor, the braking torque of the electric motor may be caused to be smaller than before the time immediately before the rotation stop of the electric motor by causing the allowable value of the limiting part to be lower than a regular value.

In addition, the drive command generation part may return the allowable value of the limiting part to the regular value and control driving of the electric motor based on a zero speed command causing the rotation speed of the electric motor to be zero when the rotation speed detected by the rotation speed detection part becomes zero.

In addition, when the amount of operation input via the operation part becomes zero so that the drive command generated in the drive command generation part is caused to be zero, the drive command generation part may generate the drive command driving the electric motor at a predetermined low speed until the time immediately before the rotation stop of the electric motor, and at the time immediately before the rotation stop of the electric motor, generate the drive command driving the electric motor based on the speed command output from the speed command output part and the rotation speed detected by the rotation speed detection part, thereby causing the braking torque of the electric motor to be smaller than before the time immediately before the rotation stop.

In addition, the drive command generation part may control driving of the electric motor based on a zero speed command causing the rotation speed of the electric motor to be zero when the rotation speed detected by the rotation speed detection part becomes zero.

A construction machine according to one aspect of the present invention includes the turning drive control unit as described in any of the above.

Effects of the Invention

According to the present invention, the effect is produced that it is possible to provide a turning drive control unit that makes ride quality good at a turning stop time and enables a construction machine to have a longer useful service life, and a construction machine including the same.

BRIEF DESCRIPTION OF THE DRAWINGS

FIG. 14 is a characteristics chart for illustrating an operation at a time when turning is stopped by the drive control of the turning drive control unit 40 of the fourth embodiment.

Figure 1:
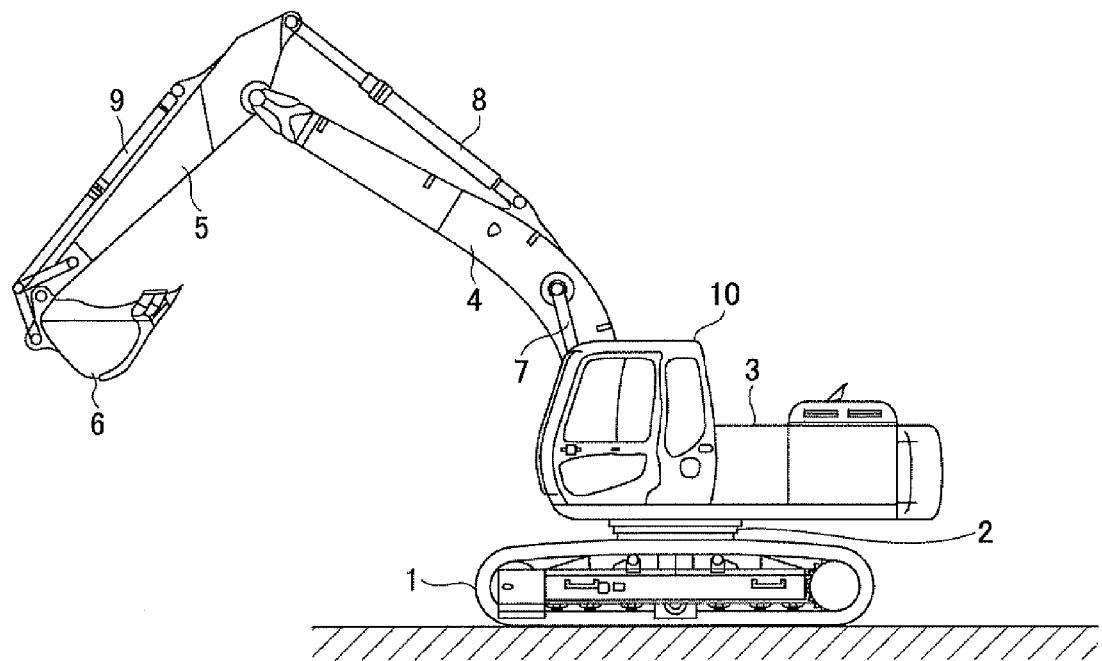
FIG. 1 is a side view illustrating a construction machine including a turning drive control unit of a first embodiment.

DESCRIPTION OF THE REFERENCE NUMERALS 1 lower-part running body
1A, 1B hydraulic motor
2 turning mechanism
3 upper-part turning body
4 boom
5 arm
6 bucket
7 boom cylinder
8 arm cylinder
9 bucket cylinder
10 cabin
11 engine
12 motor generator
13 reduction machine
14 main pump
15 pilot pump
16 high-pressure hydraulic line
17 control valve
18 inverter
19 battery
20 inverter
21 turning electric motor
21a rotation shaft
21A, 21B relay
22 resolver
23 mechanical brake
24 turning reduction machine
25 pilot line
26 operation apparatus
26A, 26B lever
26C pedal
27 hydraulic line
28 hydraulic line
29 pressure sensor
30 controller
31 speed command conversion part
32 drive control unit
40 turning drive control unit
50 drive command generation part
51 subtractor
52 PI control part
53 torque limiting part
54 torque limiting part
55 subtractor
56 PI control part
57 current conversion part
58 turning motion detection part
60 main control part

BEST MODE FOR CARRYING OUT THE INVENTION

A description is given below of embodiments to which a turning drive control unit according to the present invention and a construction machine including the same are applied.

First Embodiment

FIG. 1 is a side view illustrating a construction machine including a turning drive control unit of a first embodiment.

An upper-part turning body 3 is mounted through a turning mechanism 2 on a lower-part traveling body 1 of this hybrid construction machine. Further, in addition to a boom 4, an arm 5, a bucket 6, and a boom cylinder 7, an arm cylinder 8, and a bucket cylinder 9 for hydraulically driving them, a cabin 10 and power sources are mounted on the upper-part turning body 3.

[Overall Configuration]

Figure 2:
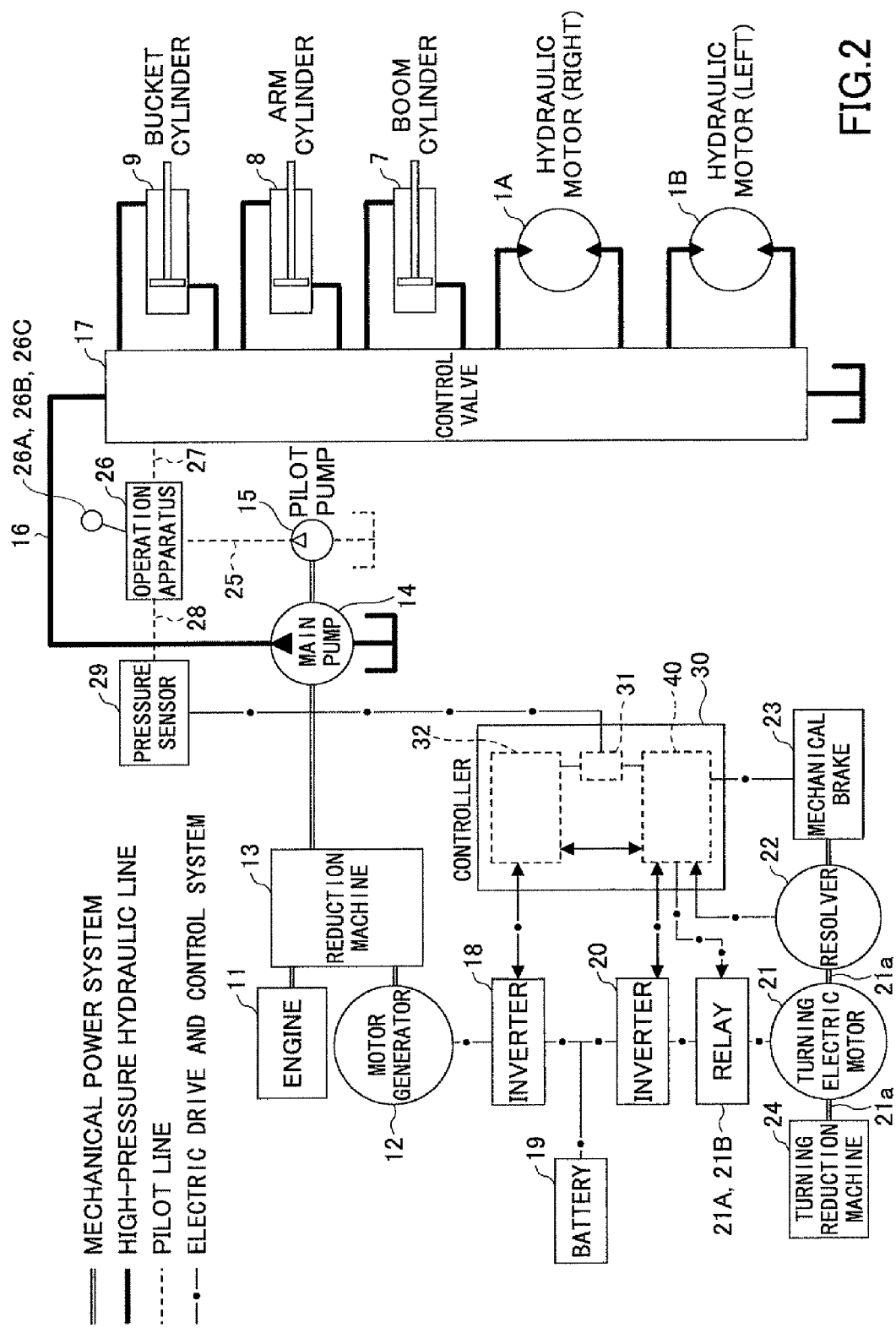
FIG. 2 is a block diagram illustrating a configuration of the construction machine including the turning drive control unit of the first embodiment.

FIG. 2 is a block diagram illustrating a configuration of the construction machine including the turning drive control unit of the first embodiment. In FIG. 2, a double line, a solid line, a broken line, and a one-dot-chain line indicate a mechanical power system, a high-pressure hydraulic line, a pilot line, and an electric drive and control system, respectively.

An engine 11 as a mechanical drive part and a motor generator 12 as an assist drive part are both connected to the input shafts of a reduction machine 13 as a power-up machine. Further, a main pump 14 and a pilot pump 15 are connected to the output shaft of this reduction machine 13. A control valve 17 is connected to the main pump 14 via a high-pressure hydraulic line 16.

The control valve 17 is a control unit that controls a hydraulic system in the construction machine of the first embodiment. Hydraulic motors 1A (for the right) and 1B (for the left) for the lower-part traveling body 1, the boom cylinder 7, the arm cylinder 8, and the bucket cylinder 9 are connected to this control valve 17 via high-pressure hydraulic lines.

Further, a battery 19 is connected to the motor generator 12 via an inverter 18. Further, a turning electric motor 21 is connected to the battery 19 via an inverter 20 and relays 21A and 21B.

A resolver 22, a mechanical brake 23, and a turning reduction machine 24 are connected to a rotation shaft 21a of the turning electric motor 21. Further, an operation apparatus 26 is connected to the pilot pump 15 via a pilot line 25.

The control valve 17 and a pressure sensor 29 are connected to the operation apparatus 26 via hydraulic lines 27 and 28, respectively. A controller 30 that controls the driving of the electric system of the construction machine of the first embodiment is connected to this pressure sensor 29.

This construction machine of the first embodiment is a hybrid construction machine that uses the engine 11, the motor generator 12, and the turning electric motor 21 as power sources. These power sources are mounted on the upper-part turning body 3 illustrated in FIG. 1. A description is given below of each part.

[Configuration of Each Part]

The engine 11, which is, for example, an internal combustion engine constituted of a diesel engine, has its output shaft connected to one of the input shafts of the reduction machine 13. The engine 11 is operated constantly during the operation of the construction machine.

The motor generator 12 may be an electric motor capable of performing both a power running operation and a regenerative operation. Here, a motor generator AC-driven by the inverter 18 is illustrated as the motor generator 12. This motor generator 12 may be constituted of, for example, an IPM (Interior Permanent Magnetic) motor having magnets embedded in a rotor. The rotation shaft of the motor generator 12 is connected to the other one of the input shafts of the reduction machine 13.

The reduction machine 13 has two input shafts and one output shaft. The two input shafts are connected to the drive shaft of the engine 11 and the drive shaft of the motor generator 12, respectively. Further, the output shaft is connected to the drive shaft of the main pump 14. In the case of a heavy load on the engine 11, the motor generator 12 performs a power running operation, so that the driving force of the motor generator 12 is transmitted to the main pump 14 via the output shaft of the reduction machine 13. This assists the driving of the engine 11. On the other hand, in the case of a light load on the engine 11, the driving force of the engine 11 is transmitted to the motor generator 12 via the reduction machine 13, so that the motor generator 12 performs a regenerative operation to generate electric power. The power running operation and the regenerative operation of the motor generator 12 are switched by the controller 30 in accordance with a load on the engine 11.

The main pump 14 is a pump that generates a hydraulic pressure to be supplied to the control valve 17. This hydraulic pressure is supplied via the control valve 17 to drive each of the hydraulic motors 1A and 1B, the boom cylinder 7, the arm cylinder 8, and the bucket cylinder 9.

The pilot pump 15 is a pump that generates a pilot pressure necessary for a hydraulic operation system. A description is given below of a configuration of this hydraulic operation system.

The control valve 17 is a hydraulic pressure control unit that hydraulically controls the driving of the hydraulic motors 1A and 1B for the lower-part traveling body 1, the boom cylinder 7, the arm cylinder 8, and the bucket cylinder 9, which are connected via high-pressure hydraulic lines to the control valve 17, by controlling hydraulic pressure to be supplied to each of them in accordance with an input of an operation by an operator.

The inverter 18 is an inverter provided between the motor generator 12 and the battery 19 in order to supply electric power necessary for the power running operation of the motor generator 12 from the battery 19 to the motor generator 12 and to charge the battery 19 with the electric power generated by the regenerative operation of the motor generator 12.

The battery 19 is provided between the inverter 18 and the inverter 20. Thereby, the battery 19 serves as a power supply for supplying necessary electric power for a power running operation when at least one of the motor generator 12 and the turning electric motor 21 is performing the power running operation and for storing the electric power regenerated by a regenerative operation as electric energy when at least one of the motor generator 12 and the turning electric motor 21 is performing the regenerative operation.

The inverter 20, which is provided between the turning electric motor 21 and the battery 19 as described above, controls the operation of the turning electric motor 21 based on instructions from the controller 30. As a result, when controlling the power running operation of the turning electric motor 21, the inverter 20 supplies necessary electric power from the battery 19 to the turning electric motor 21. Further, during the regenerative operation of the turning electric motor 21, the inverter charges the battery 19 with the electric power generated by the turning electric motor 21.

Here, the regenerative operation of the turning electric motor 21 at the time of deceleration is referred to as a first regenerative operation and is thereby distinguished from a below-described second regenerative operation, which is a regenerative operation in a short-circuited state. In the case of describing the operating state of the turning electric motor 21, it is simply described as "regenerative operation" if not making a distinction between the first regenerative operation and the second regenerative operation in particular.

The turning electric motor 21, which may be an electric motor capable of both a power running operation and a regenerative operation, is provided in order to drive the turning mechanism 2 of the upper-part turning body 3. The turning electric motor 21 is subjected to drive control so as to accelerate the upper-part turning body 3 by a power running operation and to perform the first regenerative operation at the time of decelerating the upper-part turning body 3. Here, a motor generator AC-driven by the inverter 20 is illustrated as the turning electric motor 21. This turning electric motor 21 may be constituted of an IPM motor of a magnet embedded type.

The charge and discharge of the battery 19 is controlled by the controller 30 based on the charge state of the battery 19, the operating state (power running operation or regenerative operation) of the motor generator 12, and the operating state (power running operation or first regenerative operation) of the turning electric motor 21.

Figure 3:
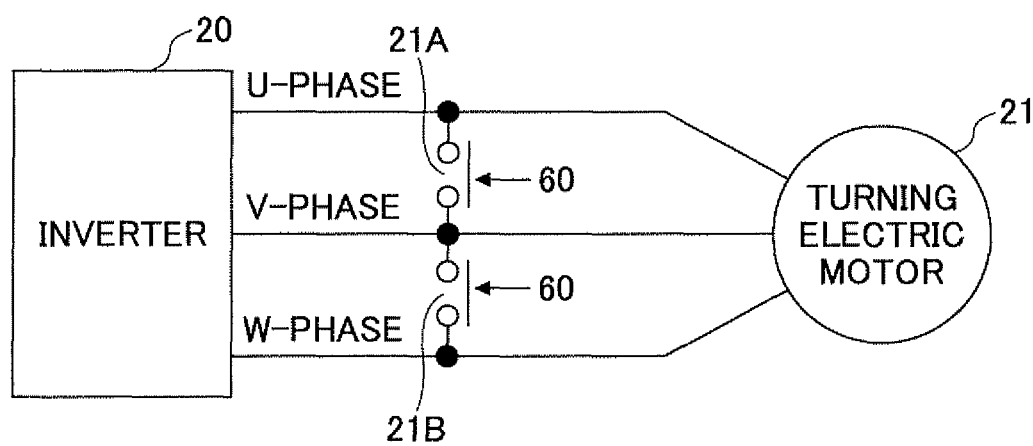
FIG. 3 is a diagram illustrating relays attached to a turning electric motor in the construction machine of the first embodiment.

The relays 21A and 21B are provided in the three-phase interconnection (U-phase, V-phase, and W-phase) between the inverter 20 and the turning electric motor 21 as illustrated in FIG. 3. The relay 21A is provided between the U-phase and the V-phase, and the relay 21B is provided between the V-phase and the W-phase. When the relays 21A and 21B are closed, the three-phase interconnection of the turning electric motor 21 is short-circuited, so that the operating state of the turning electric motor 21 switches to the second regenerative operation.

The electric power generated in the state of the second regenerative operation is consumed in the internal resistor of the turning electric motor 21. In this state of the second regenerative operation, a braking torque is generated that is determined by the resistance of the internal resistor and the rotation speed of the rotation shaft 21a of the turning electric motor 21. The relays 21A and 21B, whose opening and closing is controlled by a main control part 60 of a turning drive control unit 40 to be described below, are opened when the driving of the turning electric motor 21 is controlled based on a speed command.

The resolver 22 is a sensor that detects the rotation position and the rotation angle of the rotation shaft 21a of the turning electric motor 21. The resolver 22 is mechanically joined to the turning electric motor 21 to detect a difference between the rotation position before rotation and the rotation position after a counterclockwise rotation or a clockwise rotation of the rotation shaft 21a of the turning electric motor 21, thereby detecting the rotation angle and the rotation direction of the rotation shaft 21a. By detecting the rotation angle of the rotation shaft 21a of the turning electric motor 21, the rotation angle and the rotation direction of the turning mechanism 2 are derived.

The mechanical brake 23, which is a braking device that generates a mechanical braking force, mechanically stops the rotation shaft 21a of the turning electric motor 21. This mechanical brake 23 is switched between braking (ON) and release (OFF) by an electromagnetic switch.

The turning reduction machine 24 is a reduction machine that reduces the rotation speed of the rotation shaft 21a of the turning electric motor 21 and mechanically transmits it to the turning mechanism 2.

The turning mechanism 2 is turnable with the mechanical brake 23 of the turning electric motor 21 being released, and the upper-part turning body 3 is turned counterclockwise or clockwise in this state.

The operation apparatus 26, which is an operation apparatus for operating the turning electric motor 21, the lower-part traveling body 1, the boom 4, the arm 5, and the bucket 6, includes levers 26A and 26B and pedals 26C. The lever 26A, which is a lever for operating the turning electric motor 21 and the arm 5, is provided near the driver's seat of the upper-part turning body 3. The lever 26B, which is a lever for operating the boom 4 and the bucket 6, is provided near the driver's seat of the upper-part turning body 3. The pedals 26C, which are a pair of pedals for operating the lower-part traveling body 1, are provided at the foot of the driver's seat.

This operation apparatus 26 converts a hydraulic pressure (a primary-side hydraulic pressure) supplied through the pilot line 25 into a hydraulic pressure (a secondary-side hydraulic pressure) corresponding to the amount of operation by the operator, and outputs it. The secondary-side hydraulic pressure output from the operation apparatus 26 is supplied to the control valve 17 through the hydraulic line 27, and is also detected by the pressure sensor 29.

When the levers 26A and 26B and the pedal 26C are operated respectively, the control valve 17 is driven via the hydraulic line 27, so that the hydraulic pressures inside the hydraulic motors 1A and 1B, the boom cylinder 7, the arm cylinder 8, and the bucket cylinder 9 are controlled. Thereby, the lower-part traveling body 1, the boom 4, the arm 5, and the bucket 6 are driven.

Further, the mechanical brake 23 is configured to be released by the controller 30 when one of the levers 26A and 26B and the pedal 26C is operated.

The hydraulic line 27 supplies hydraulic pressures necessary for driving the hydraulic motors 1A and 1B, the boom cylinder 7, the arm cylinder 8, and the bucket cylinder 9 to the control valve 17.

In the pressure sensor 29, a change in the hydraulic pressure inside the hydraulic line 28 due to the operation of the lever 26A is detected. The pressure sensor 29 outputs an electrical signal representing the hydraulic pressure inside the hydraulic line 28. This electrical signal is input to the controller 30.

[Controller 30]

The controller 30, which is a control unit that controls the driving of the construction machine of the first embodiment, includes a speed command conversion part 31, a drive control unit 32, and the turning drive control unit 40. The controller 30 is constituted of a processor including a CPU (Central Processing Unit) and an internal memory, and the speed command conversion part 31, the drive control unit 32, and the turning drive control unit 40 are devices implemented by the CPU of the controller 30 executing a program for drive control contained in the internal memory.

The speed command conversion part 31 is a processing part configured to convert a signal input from the pressure sensor 29 into a speed command. Thereby, the amount of operation of the lever 26A is converted into a speed command (rad/s) for causing the turning electric motor 21 to be rotationally driven. This speed command is input to the drive control unit 32 and the turning drive control unit 40.

The drive control unit 32 is a control unit for controlling the operation of the motor generator 12 (switching between a power running operation and a regenerative operation) and controlling the charge and discharge of the battery 19. This drive control unit 32 switches the power running operation and the regenerative operation of the motor generator 12 in accordance with the load state of the engine 11 and the charge state of the battery 19. The drive control unit 32 controls the charge and discharge of the battery 19 via the inverter 18 by switching the power running operation and the regenerative operation of the motor generator 12.

[Conversion Characteristic of Operation Amount/Speed Command]

Figure 4:
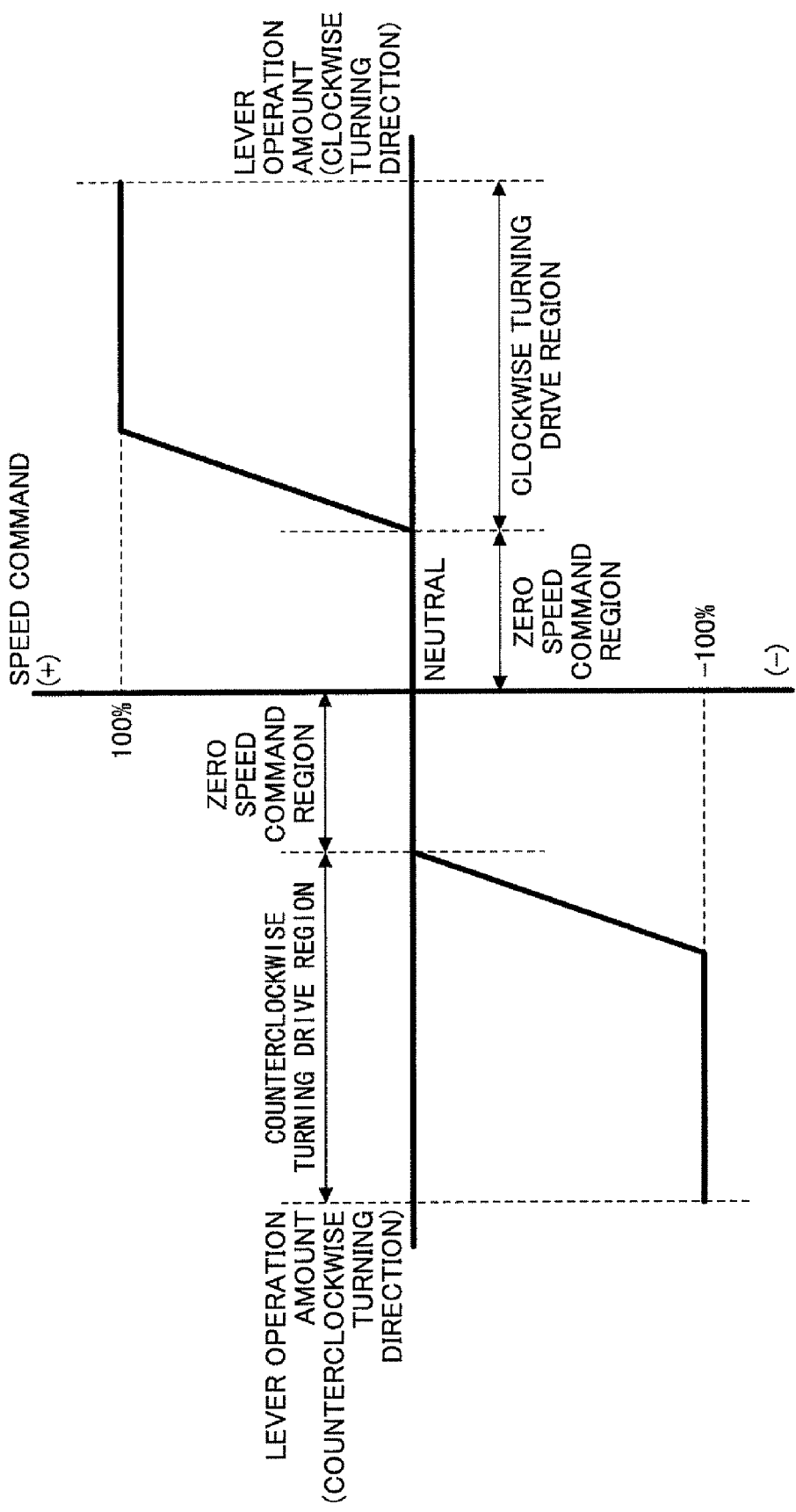
FIG. 4 is a diagram illustrating a conversion characteristic of converting the amount of operation of an operation lever 26A into a speed command (a speed command for causing a turning electric motor 21 to rotate to cause an upper-part turning body 3 to turn) in a speed command conversion part 31 of the construction machine of the first embodiment.

FIG. 4 is a diagram illustrating a conversion characteristic of converting the amount of operation of the operation lever 26A into a speed command (a speed command for causing the turning electric motor 21 to rotate to cause the upper-part turning body 3 to turn) in the speed command conversion part 31 of the construction machine of the present embodiment.

Here, the conversion characteristic illustrated in FIG. 4 is a characteristic in the case of stopping the turning electric motor 21, and is divided into four regions, which are zero speed command regions (for counterclockwise turning and for clockwise turning), a counterclockwise turning drive region, and a clockwise turning drive region, in accordance with the amount of operation of the operation lever 26A.

Here, in the control system of the construction machine of the first embodiment, the rotation direction in which the rotation shaft 21a of the turning electric motor 21 rotates counterclockwise is referred to as "forward rotation," and a positive sign is attached to the amount of control representing driving in the forward rotation direction. On the other hand, the rotation direction in which the rotation shaft 21a of the turning electric motor 21 rotates clockwise is referred to as "reverse rotation," and a negative sign is attached to the amount of control representing driving in the reverse rotation direction. The forward rotation corresponds to the clockwise turning of the upper-part turning body 3, and the reverse rotation corresponds to the counterclockwise turning of the upper-part turning body 3.

[Zero Speed Command Regions]

The zero speed command regions are regions provided in the vicinity of the neutral (within the range of ±20%) in the operating directions of the lever 26A to be used in the case of stopping the turning upper-part turning body 3. When the amount of operation of the operation lever 26A is within the range of these zero speed command regions, a zero speed command is output from the speed command conversion part 31, so that a braking torque is applied on the rotation shaft 21a of the turning electric motor 21 that is turning. When the rotation speed of the rotation shaft 21a of the turning electric motor 21 becomes zero, the mechanical brake 23 is put into operation, so that the upper-part turning body 3 is kept stationary.

Here, the zero speed command is a speed command for causing the rotation speed of the rotation shaft 21a of the turning electric motor 21 to be zero in order to cause the turning speed of the upper-part turning body 3 to be zero, and is used as a target value for causing the rotation speed of the rotation shaft 21a to be closer to zero in PT (Proportional Integral) control to be described below.

The mechanical brake 23 is switched from a released state (OFF) to an operating state (ON) by the turning drive control unit 40 in the controller 30 when the rotation speed detected by a turning motion detection part 58 becomes zero.

[Counterclockwise Turning Drive Region]

The counterclockwise turning drive region is a region where a speed command for causing the upper-part turning body 3 to turn counterclockwise is output from the speed command conversion part 31.

In this region, the absolute value of a speed command is determined to increase in accordance with the amount of operation of the lever 26A. A drive command is calculated based on this speed command in the turning drive control unit 40, and the turning electric motor 21 is driven based on this drive command. As a result, the upper-part turning body 3 is driven to turn counterclockwise.

The absolute value of the speed command value in the counterclockwise turning drive region is limited by a predetermined value in order to limit the turning speed of the upper-part turning body 3 to a certain value or less.

[Clockwise Turning Drive Region]

The clockwise turning drive region is a region where a speed command for causing the upper-part turning body 3 to turn clockwise is output from the speed command conversion part 31.

In this region, the absolute value of a speed command is determined to increase in accordance with the amount of operation of the lever 26A. A drive command is calculated based on this speed command in the turning drive control unit 40, and the turning electric motor 21 is driven based on this drive command. As a result, the upper-part turning body 3 is driven to turn clockwise.

Like in the counterclockwise turning drive region, the absolute value of the speed command value in the clockwise turning drive region is limited by a predetermined value.

[Turning Drive Control Unit 40]

Figure 5:
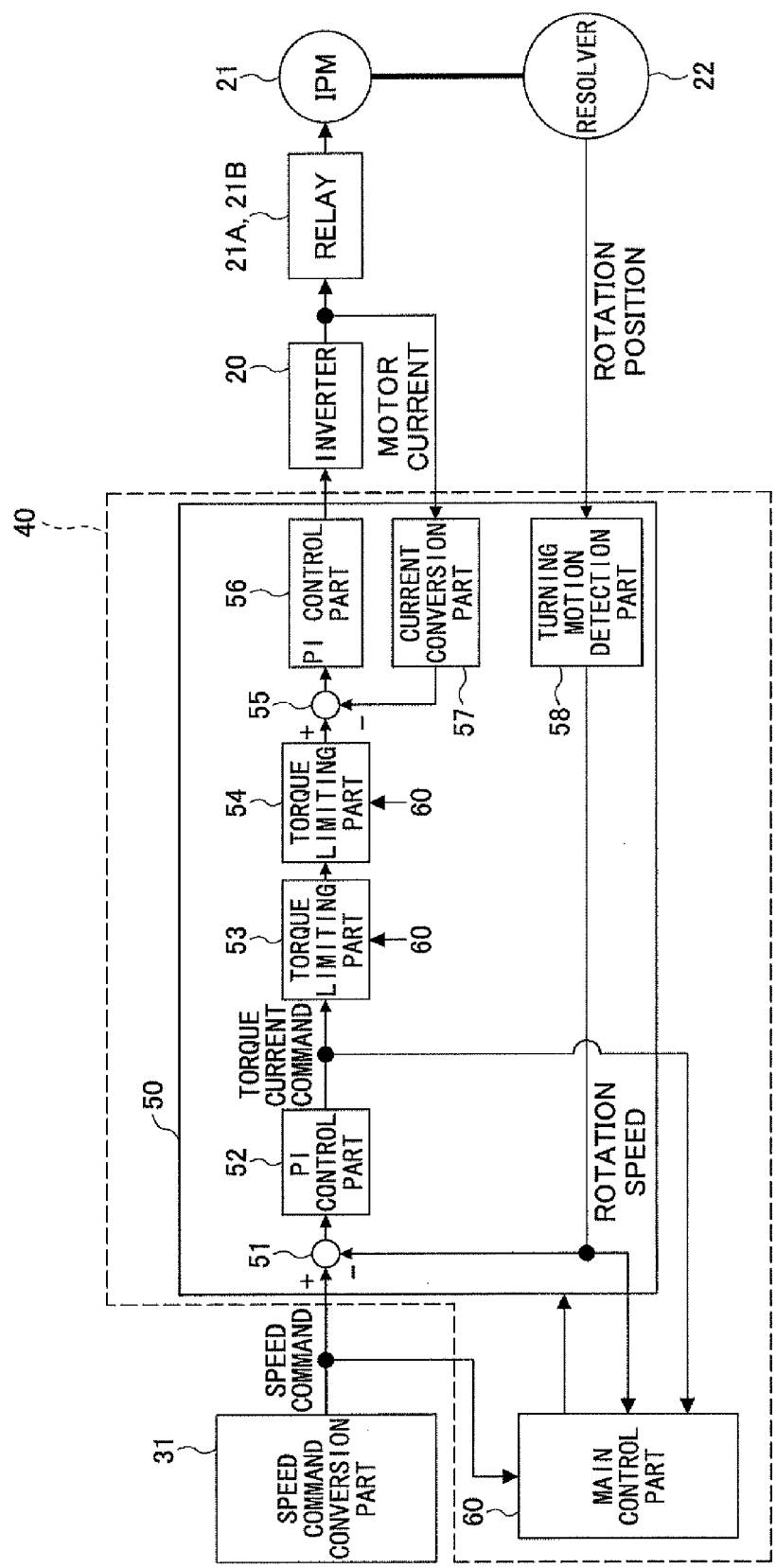
FIG. 5 is a control block diagram illustrating a configuration of a turning drive control unit of the first embodiment.

FIG. 5 is a control block diagram illustrating a configuration of the turning drive control unit 40 of the first embodiment.

The turning drive control unit 40, which is a control unit for controlling the driving of the turning electric motor 21 via the inverter 20, includes a drive command generation part 50 configured to generate a drive command for driving the turning electric motor 21 and the main control part 60.

The turning drive control unit 40 calculates a drive command for controlling the driving of the turning electric motor 21 in accordance with the amount of operation of the lever 26A by executing a program for drive control contained in the internal memory of the controller 30.

Further, the turning drive control unit 40 controls the switching of a power running operation and a regenerative operation (first regenerative operation or second regenerative operation) and controls the charge and discharge of the battery 19 via the inverter 20 at the time of controlling the driving of the turning electric motor 21 in accordance with the amount of operation of the lever 26A.

A speed command output from the speed command conversion part 31 in accordance with the amount of operation of the lever 26A is input to the drive command generation part 50, so that this drive command generation part 50 generates a drive command based on the speed command. The drive command output from the drive command generation part 50 is input to the inverter 20, and the turning electric motor 21 is AC-driven by this inverter 20 based on a PWM control signal.

The main control part 60 is a control part configured to perform processing necessary for controlling the turning drive control unit 40. The specific contents of the processing are described at each related part.

The turning drive control unit 40 controls the switching of a power running operation and a regenerative operation and controls the charge and discharge of the battery 19 via the inverter 20 at the time of controlling the driving of the turning electric motor 21 in accordance with the amount of operation of the operation lever 26A.

[Drive Command Generation Part 50]

The drive command generation part 50 includes a subtractor 51, a PI (Proportional Integral) control part 52, a torque limiting part 53, a torque limiting part 54, a subtractor 55, a PI control part 56, a current conversion part 57, and the turning motion detection part 58. A speed command (rad/s) for turning drive according to the amount of operation of the lever 26A is input to the subtractor 51 of this drive command generation part 50.

The subtractor 51 subtracts the rotation speed (rad/s) of the turning electric motor 21 detected by the turning motion detection part 58 from the value of a speed command (hereinafter, speed command value) according to the amount of operation of the lever 26A, and outputs a deviation. This deviation is used for PI control for causing the rotation speed of the turning electric motor 21 to be closer to the speed command value (target value) in the PI control part 52 to be described below.

The PI control part 52 performs PI control based on the deviation input from the subtractor 51 so as to cause the rotation speed of the turning electric motor 21 to be closer to the speed command value (target value) (that is, so as to decrease this deviation), and calculates a torque current command necessary therefor. The generated torque current command is input to the torque limiting part 53.

The torque limiting part 53 performs the process of limiting the value of the torque current command (hereinafter, torque current command value) in accordance with the amount of operation of the lever 26A. This limiting process is performed based on the limitation characteristic of a slow increase in the allowable value of the torque current command value in accordance with the amount of operation of the lever 26A. An abrupt increase in the torque current command value calculated by the PI control part 52 degrades controllability. Therefore, such limiting of the torque current command value is performed in order to prevent this.

The limitation characteristic of the torque limiting part 53 is contained in the internal memory of the main control part 60. The main control part 60 reads the limitation characteristic in the internal memory, and inputs it to the torque limiting part 53.

This limitation characteristic has a characteristic to slowly increase (the absolute value of) the allowable value of the torque current command value with an increase in the amount of operation of the lever 26A, and has a characteristic for limiting both the clockwise direction and the counterclockwise direction of the upper-part turning body 3. Data showing the limitation characteristic are stored in the internal memory of the main control part 60, and are read by the torque limiting part 53.

The torque limiting part 54 limits the torque current command value input from the torque limiting part 53 so that a torque generated by the torque current command input from the torque limiting part 53 is less than or equal to the maximum allowable torque value of the turning electric motor 21. This limitation of the torque current command value is performed on both the clockwise rotation and the counterclockwise rotation of the upper-part turning body 3 the same as in the torque limiting part 53.

Here, the upper limit value (maximum value for clockwise turning) and the lower limit value (minimum value for counterclockwise turning) of the allowable value for limiting the torque current command value in the torque limiting part 54 are set to such values as to enable generation of drive torque for turning the boom 4, the arm 5, and the bucket 6 to the upper side of a slope even in the state where the upper-part turning body 3 on the slope has a large inertia moment with the boom 4, the arm 5 and the bucket 6 being extended even if the torque current command value is limited by the torque limiting part 54.

The allowable value of the torque limiting part 54 is contained in the internal memory of the main control part 60, and the main control part 60 reads the allowable value in the internal memory and inputs it to the torque limiting part 54.

The subtractor 55 outputs a deviation obtained by subtracting the output value of the current conversion part 57 from the torque current command value input from the torque limiting part 54. This deviation is used in PI control for causing the drive torque of the turning electric motor 21 output from the current conversion part 57 to be closer to torque represented by the torque current command value (target value) input via the torque limiting part 54 in a feedback loop including the PI control part 56 and the current conversion part 57 described below.

The PI control part 56, based on the deviation input from the subtractor 55, performs PI control to reduce this deviation and generates a voltage command to become a final drive command to be sent to the inverter 20. The inverter 20 PWM-drives the turning electric motor 21 based on the torque current command input from the PI control part 56.

The current conversion part 57 detects the motor current of the turning electric motor 21, converts this into a value corresponding to the torque current command, and inputs it to the subtractor 55.

The turning motion detection part 58 detects a change in the rotation position of the turning electric motor 21 detected by the resolver 22 (that is, the rotation of the upper-part turning body 3), and derives the rotation speed of the turning electric motor 21 from a temporal change in the rotation position through a differential operation. Data representing the derived rotation speed are input to the subtractor 51 and the main control part 60.

In the drive command generation part 50 of such a configuration, a torque current command for driving the turning electric motor 21 is generated based on the speed command input from the speed command conversion part 31, so that the upper-part turning body 3 is caused to turn at a desired speed.

Figure 6:
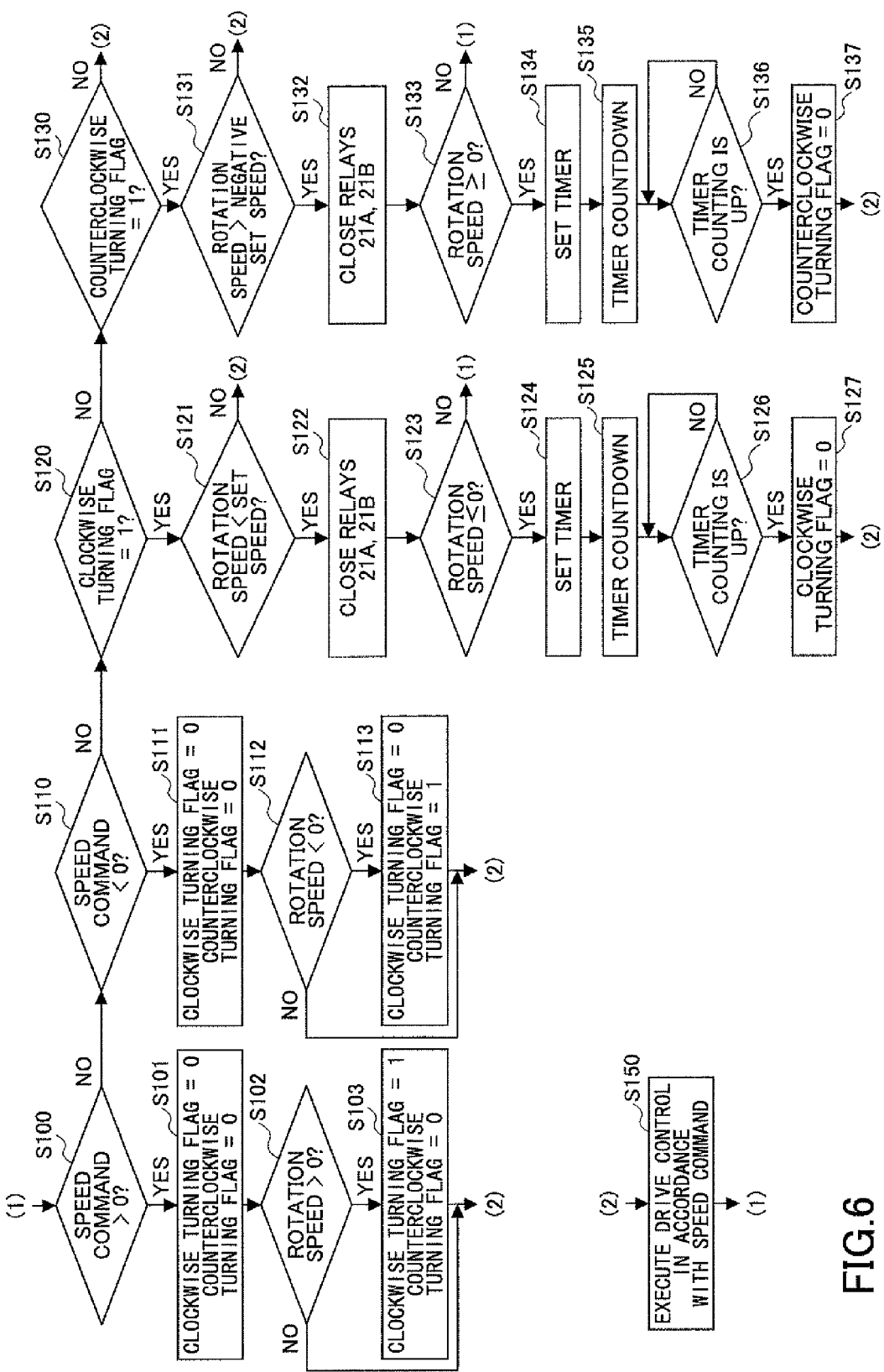
FIG. 6 is a chart illustrating a procedure for controlling the driving of the turning electric motor 21 by a main control part 60 of the turning drive control unit 40 of the first embodiment.

FIG. 6 is a chart illustrating a procedure for controlling the driving of the turning electric motor 21 by the main control part 60 of the turning drive control unit 40 of the first embodiment.

In this process, in controlling the driving of the turning electric motor 21, the main control part 60 uses a clockwise turning flag and a counterclockwise turning flag showing that the upper-part turning body 3 is turning clockwise and counterclockwise. The clockwise turning flag shows the presence or absence of the "forward rotation," or the counterclockwise rotation of the rotation shaft 21a of the turning electric motor 21, and the counterclockwise turning flag shows the presence or absence of the "reverse rotation," or the clockwise rotation of the rotation shaft 21a of the turning electric motor 21.

Further, the main control part 60 includes a timer for counting elapsed time in steps S124 through S126 and S134 through S136 to be described below.

The process illustrated in FIG. 6 starts at (1), and the process of step S100 is first executed.

The main control part 60 determines whether the value of a speed command is positive (step S100). The speed command is input to the main control part 60 from the speed command conversion part 31. Therefore, this process is a process executed by determining whether the value of the speed command input to the main control part 60 from the speed command conversion part 31 is positive.

If determining that the value of the speed command is positive, the main control part 60 sets both the clockwise turning flag and the counterclockwise turning flag to "0" (step S101). This is for resetting both flags.

Next, the main control part 60 determines whether a rotation speed is positive (step S102). If determining that the rotation speed is positive, the main control part 60 sets the clockwise turning flag to "1" and sets the counterclockwise turning flag to "0" (step S103). This is because in this case, the rotation shaft 21a of the turning electric motor 21 is in forward rotation so that the upper-part turning body 3 is turning clockwise.

Further, the main control part 60 causes the turning drive control unit 40 to control the driving of the turning electric motor 21 in accordance with the speed command output from the speed command conversion part 31 (step S150). Thereby, the upper-part turning body 3 is caused to turn clockwise.

In the case of determining that the rotation speed is not positive in step S102 as well, the procedure proceeds to step S150, and the main control part 60 causes the turning drive control unit 40 to control the driving of the turning electric motor 21 in accordance with the speed command output from the speed command conversion part 31 (step S150). This is the case where the rotation speed of the rotation shaft 21a of the turning electric motor 21 is zero or negative although a speed command for forward rotation has been output from the speed command conversion part 31, and specifically, corresponds to the case where the upper-part turning body 3 is stationary or being caused to turn counterclockwise by an external force although the operation lever 26A is being operated in the direction of clockwise turning.

When the above process ends, the procedure returns to (1).

If determining in step S100 that the speed command is not positive, the main control part 60 determines whether the speed command is negative (step S110). The speed command is input to the main control part 60 from the speed command conversion part 31. Therefore, this process is a process executed by determining whether the value of the speed command input to the main control part 60 from the speed command conversion part 31 is negative.

If determining that the value of the speed command is negative, the main control part 60 sets both the clockwise turning flag and the counterclockwise turning flag to "0" (step S111). This is for resetting both flags.

Next, the main control part 60 determines whether a rotation speed is negative (step S112). If determining that the rotation speed is negative, the main control part 60 sets the clockwise turning flag to "0" and sets the counterclockwise turning flag to "1" (step S113). This is because in this case, the rotation shaft 21a of the turning electric motor 21 is in reverse rotation so that the upper-part turning body 3 is turning counterclockwise.

Further, the main control part 60 causes the turning drive control unit 40 to control the driving of the turning electric motor 21 in accordance with the speed command output from the speed command conversion part 31 (step S150). Thereby, the upper-part turning body 3 is caused to turn counterclockwise.

In the case of determining that the rotation speed is not negative in step S112 as well, the procedure proceeds to step S150, and the main control part 60 causes the turning drive control unit 40 to control the driving of the turning electric motor 21 in accordance with the speed command output from the speed command conversion part 31 (step S150). This is the case where the rotation speed of the rotation shaft 21a of the turning electric motor 21 is zero or positive although a speed command for reverse rotation has been output from the speed command conversion part 31, and specifically, corresponds to the case where the upper-part turning body 3 is stationary or being caused to turn clockwise by an external force although the operation lever 26A is being operated in the direction of counterclockwise turning.

When the above process ends, the procedure returns to (1).

If determining in step S110 that the speed command is not negative, the main control part 60 determines whether the clockwise turning flag is "1" (step S120). This is for determining whether the upper-part turning body 3 is turning clockwise (the rotation shaft 21a of the turning electric motor 21 is in forward rotation) with the speed command being zero. This corresponds to, for example, the case where the amount of operation of the lever 26A is in the zero speed command region in order to come to a stop from a clockwise turning state.

Next, the main control part 60 determines whether a rotation speed is lower than a predetermined set speed (S121). The predetermined set speed is extremely low, and is set to, for example, a 10% speed. This is for determining whether the state is immediately before a stop of rotation. The 10% speed is a rotation speed in the case of the highest turning speed being a 100% speed.

If determining that the rotation speed is lower than the set speed, the main control part 60 closes the relays 21A and 21B to short-circuit the turning electric motor 21 (step S122). This is for stopping the rotation shaft 21a with rotational resistance due to a second regenerative operation by causing the turning electric motor 21 to perform the second regenerative operation by short-circuiting its three-phase interconnection in the case of determining that the rotation is immediately before coming to a stop.

Next, the main control part 60 determines whether or not the rotation speed is less than or equal to zero (step S123). This is for determining whether or not the rotation shaft 21a has stopped or reversed.

If determining that the rotation speed is less than or equal to zero, the main control part 60 sets a timer (step S124). This is for preparing for counting elapsed time. Here, the timer is set to 0.1 seconds.

Next, the main control part 60 starts counting elapsed time with the timer (step S125). This is for making a determination for canceling the short-circuited state based on the elapsed time.

The main control part 60 determines whether the counting is up (step S126). This process of step S126 is repeatedly performed until it is determined that the counting is up.

Next, the main control part 60 sets the clockwise turning flag to "0" (step S127). This is because it is believed that the rotation shaft 21a has come to a stop with the rotational resistance due to the second regenerative operation as a result of causing the turning electric motor 21 to perform the second regenerative operation by short-circuiting its three-phase interconnection only for 0.1 seconds.

Further, the main control part 60 causes the turning drive control unit 40 to control the driving of the turning electric motor 21 in accordance with the speed command output from the speed command conversion part 31 (step S150). At this point, the speed command is a zero speed command. Therefore, a braking torque is applied on the rotation shaft 21a of the turning electric motor 21, so that the rotation speed of the rotation shaft 21a is controlled to be zero. Thereby, the upper-part turning body 3 is stopped. Therefore, the mechanical brake 23 is put into operation, so that the upper-part turning body 3 is kept stationary.

In the case of determining that the rotation speed is not less than the set speed in step S121 as well, the procedure proceeds to step S150, and the main control part 60 causes the turning drive control unit 40 to control the driving of the turning electric motor 21 in accordance with the speed command output from the speed command conversion part 31 (step S150). This is the state where a zero speed command has been output from the speed command conversion part 31 so that a braking torque is applied on the rotation shaft 21a of the turning electric motor 21 while the rotation speed during the clockwise turning is more than or equal to the set value. This corresponds to such a time as is immediately after a release of the lever 26A during the clockwise turning.

Further, if it is determined in step S123 that the rotation speed is not less than or equal to zero (that is, the rotation speed is positive), the procedure proceeds to step S100, and the procedure is repeatedly performed.

When the above process ends, the procedure returns to (1) (step S100).

If determining in step S120 that the clockwise turning flag is not "1," the main control part 60 determines whether the counterclockwise turning flag is "1" (step S130). This is for determining whether the upper-part turning body 3 is turning counterclockwise (the rotation shaft 21a of the turning electric motor 21 is in reverse rotation) with the speed command being zero. This corresponds to, for example, the case where the amount of operation of the lever 26A is in the zero speed command region in order to come to a stop from a counterclockwise turning state.

Next, the main control part 60 determines whether a rotation speed is higher than a predetermined negative set speed (S131). The predetermined set speed is extremely low, and is set to, for example, a −10% speed. This is for determining whether the state is immediately before a stop of rotation. The −10% speed is a rotation speed in the case of the highest turning speed in the reverse rotation direction being a −100% speed.

If determining that the rotation speed is higher than the predetermined negative set speed, the main control part 60 closes the relays 21A and 21B to short-circuit the turning electric motor 21 (step S132). This is for stopping the rotation shaft 21a with rotational resistance due to a second regenerative operation by causing the turning electric motor 21 to perform the second regenerative operation by short-circuiting its three-phase interconnection in the case of determining that the rotation is immediately before coming to a stop.

Next, the main control part 60 determines whether or not the rotation speed is more than or equal to zero (step S133). This is for determining whether or not the rotation shaft 21a has stopped or reversed.

If determining that the rotation speed is more than or equal to zero, the main control part 60 sets a timer (step S134). This is for preparing for counting elapsed time. Here, the timer is set to 0.1 seconds.

Next, the main control part 60 starts a countdown of elapsed time with the timer (step S135). This is for counting elapsed time.

The main control part 60 determines whether the counting is up (step S136). This process of step S136 is repeatedly performed until it is determined that the counting is up.

Next, the main control part 60 sets the counterclockwise turning flag to "0" (step S137). This is because it is believed that the rotation shaft 21a has come to a stop with the rotational resistance due to the second regenerative operation as a result of causing the turning electric motor 21 to perform the second regenerative operation by short-circuiting its three-phase interconnection only for 0.1 seconds.

Further, the main control part 60 causes the turning drive control unit 40 to control the driving of the turning electric motor 21 in accordance with the speed command output from the speed command conversion part 31 (step S150). At this point, the speed command is a zero speed command. Therefore, a braking torque is applied on the rotation shaft 21a of the turning electric motor 21, so that the rotation speed of the rotation shaft 21a is controlled to be zero. Thereby, the upper-part turning body 3 is stopped. Therefore, the mechanical brake 23 is put into operation, so that the upper-part turning body 3 is kept stationary.

If it is determined in step S130 that the counterclockwise turning flag is not "1," the procedure proceeds to step S150, and the main control part 60 causes the turning drive control unit 40 to control the driving of the turning electric motor 21 in accordance with the speed command output from the speed command conversion part 31 (step S150). This is for causing a stopped state due to a zero speed command or a stopped state due to the mechanical brake 23 to be kept by the drive control of the turning drive control unit 40 because turning is stopped.

In the case of determining that the rotation speed is not higher than the predetermined negative set speed in step S131 as well, the procedure proceeds to step S150, and the main control part 60 causes the turning drive control unit 40 to control the driving of the turning electric motor 21 in accordance with the speed command output from the speed command conversion part 31 (step S150). This is the state where a zero speed command has been output from the speed command conversion part 31 so that a braking torque is applied on the rotation shaft 21a of the turning electric motor 21 while the rotation speed during the counterclockwise turning is less than or equal to the set value. This corresponds to such a time as is immediately after a release of the lever 26A during the counterclockwise turning.

Further, if it is determined in step S133 that the rotation speed is not more than or equal to zero (that is, the rotation speed is negative), the procedure proceeds to step S100, and the procedure is repeatedly performed.

When the above process ends, the procedure returns to (1) (step S100).

[Description of Operation]

Figure 7:
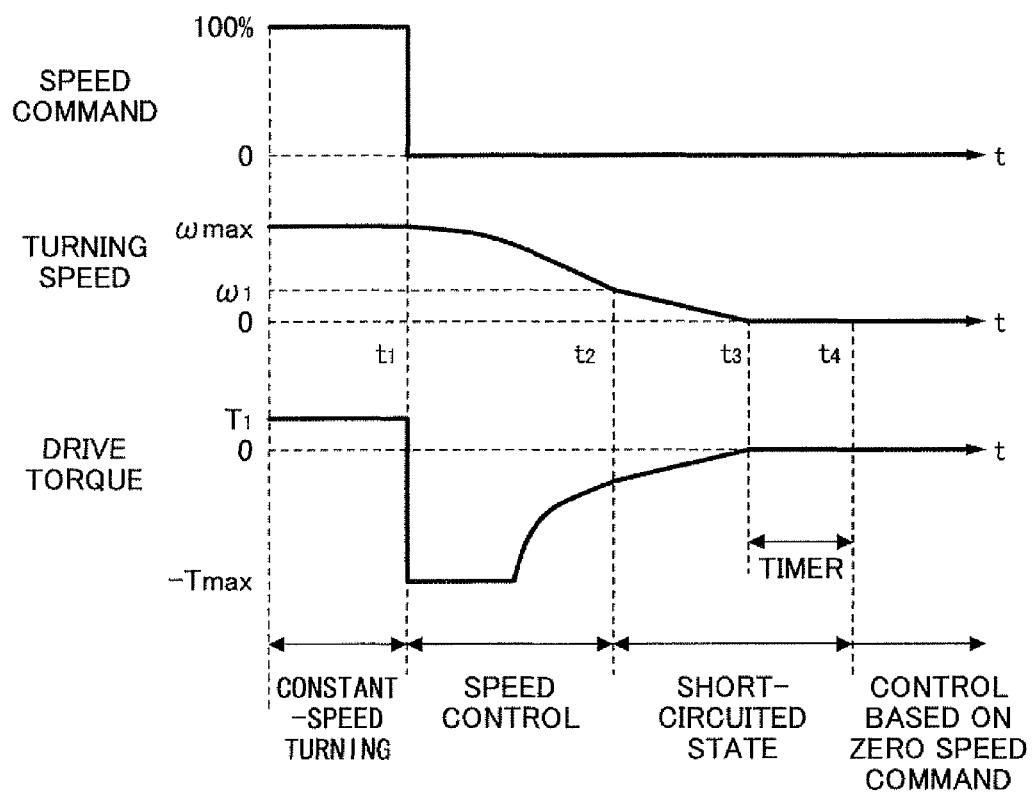
FIG. 7 is a characteristics chart for illustrating an operation at a time when turning is stopped by the drive control of the turning drive control unit 40 of the first embodiment.

FIG. 7 is a characteristics chart for illustrating an operation at a time when turning is stopped by the drive control of the turning drive control unit 40 of the first embodiment. These characteristics indicate temporal changes in a speed command, a turning speed, and a drive torque (braking torque) at a time when the upper-part turning body 3 comes to a stop from a clockwise turning state.

It is assumed that at time t=0, a turning operation input to the lever 26A of the operation apparatus 26 is a maximum amount in the clockwise direction, a 100% speed command is output from the speed command conversion part 31, the turning speed is a maximum speed ωmax (rad/s) in the clockwise turning direction, and the drive torque is T1 (N·m), which is 20% of a maximum drive torque $T_{max}$.

The state of constant speed turning like this continues until time t=t1, and the upper-part turning body 3 is turning clockwise at constant speed. This state is realized by the drive control process by step S150 illustrated in FIG. 6.

At time t=t1, when the lever 26A is returned to a neutral position, the speed command output from the speed command conversion part 31 becomes 0%, so that feedback control is performed based on a deviation between the speed command and the rotation speed. Therefore, the drive torque becomes a reverse-side maximum value "−Tmax" (that is, the braking torque at the time of clockwise direction turning is maximized), so that the turning speed gradually decreases from ωmax. With a decrease in the turning speed, the braking torque is gradually reduced from the maximum value (−Tmax). This state is realized by the drive control step by step S150 illustrated in FIG. 6.

At time t=t2, when the turning speed is reduced to a predetermined set value ω1, the main control part 60 closes the relays 21A and 21B so that the turning electric motor 21 is short-circuited. Thereby, a rotational resistance due to a second regenerative operation is generated at the rotation shaft 21a of the turning electric motor 21, so that the rotation speed of the rotation shaft 21a (turning speed) gradually decreases. This state is realized by the drive control process by step S122 illustrated in FIG. 6.

At time t=t3, when the turning speed is made zero by the second regenerative operation, the main control part 60 sets a timer and starts a countdown. This state is realized by the process by steps S123 through S125 illustrated in FIG. 6.

At time t=t4, when the counting is up in the main control part 60, the main control part 60 opens the relays 21A and 21B, and causes the turning drive control unit 40 to execute drive control based on a zero speed command. This is realized by the process by steps S126, S127, and S150 illustrated in FIG. 6.

Thereby, according to the turning drive control unit 40 of the first embodiment, by short-circuiting the turning electric motor 21 immediately before a stop of rotation, it is possible to stop the rotation shaft 21a of the turning electric motor 21 with the rotational resistance force of a regenerative operation (second regenerative operation). The rotational resistance force applied on the rotation shaft 21a at the time of this stop is extremely small and its temporal change is slow compared with the braking torque applied on the rotation shaft 21a by drive control based on a speed command without short-circuiting as in the conventional way. Therefore, immediately before a stop of rotation, it is possible to cause the braking torque of the turning electric motor 21 to be smaller than before the time immediately before the stop of rotation. Thereby, it is possible to provide a turning drive control unit and a construction machine capable of achieving a good, smooth ride at the time of a stop of rotation with the occurrence of impact due to teeth hitting due to the backlash of the turning mechanism 2 being controlled. Further, since it is possible to control teeth hitting due to the backlash of the turning mechanism 2, it is possible to prolong the useful service life of the turning mechanism 2.

Here, a description is given above of an operation in the case of the upper-part turning body 3 coming to a stop from a clockwise turning state. An operation in the case of the upper-part turning body 3 coming to a stop from a counterclockwise turning state is only different in the sign of the amount of control and is on the same operation principle. Accordingly, a description thereof is omitted.

The above description is given of a configuration where the turning electric motor 21 is an AC motor PWM-driven by the inverter 20, and the resolver 22 and the turning motion detection part 58 are used to detect its rotation speed. However, the turning electric motor 21 may be a DC motor. In this case, the inverter 20, the resolver 22, and the turning motion detection part 58 are unnecessary, and a value detected with the tacho-generator of the DC motor may be used as the rotation speed.

Further, the above description is given of a configuration where PI control is used in calculating a torque current command. Alternatively, robust control, adaptive control, proportional control, integral control, etc., may be used.

Further, the above description is given using a hybrid construction machine. However, the construction machine to which to apply the turning drive unit of the first embodiment is not limited to a hybrid type as long as the construction machine has a motorized turning mechanism.

Second Embodiment

Figure 8:
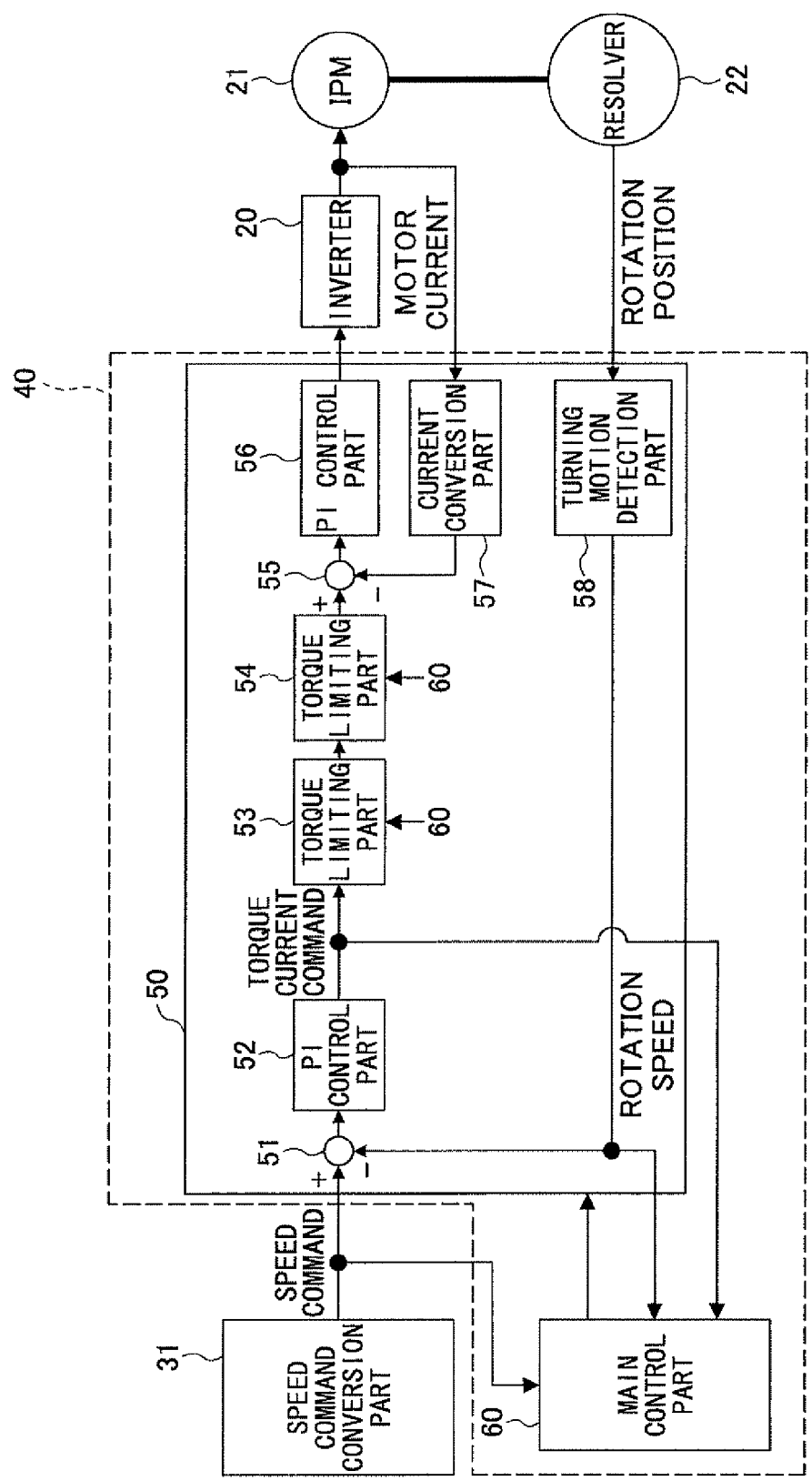
FIG. 8 is a block diagram illustrating a configuration of the turning drive control unit 40 of a second embodiment.

FIG. 8 is a block diagram illustrating a configuration of the turning drive control unit 40 of a second embodiment. The turning drive control unit 40 of the second embodiment is different from the turning drive control unit 40 of the first embodiment in not including the relays 21A and 21B, but otherwise, is based on the turning drive control unit 40 of the first embodiment in configuration. Therefore, the same components are given the same characters and their description is omitted.

The main control part 60 of the second embodiment stops the inverter 20 only for a predetermined short period of time immediately before stopping the rotation shaft 21a of the turning electric motor 21. A description is given below of a procedure using FIG. 9.

Figure 9:
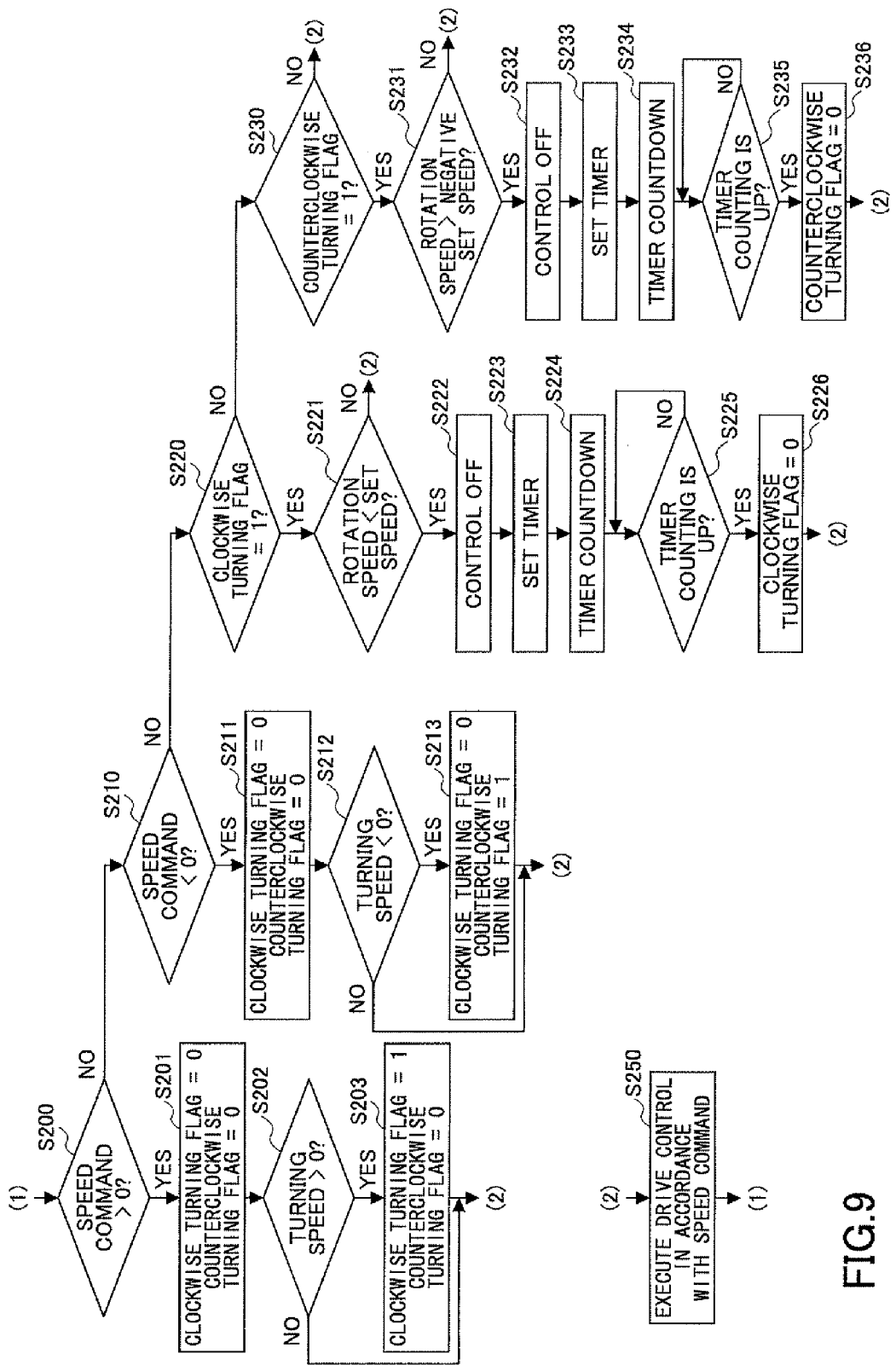
FIG. 9 is a chart illustrating a procedure for controlling the driving of the turning electric motor 21 by the main control part 60 of the turning drive control unit 40 of the second embodiment.

FIG. 9 is a chart illustrating a procedure for controlling the driving of the turning electric motor 21 by the main control part 60 of the turning drive control unit 40 of the second embodiment.

In this process, in controlling the driving of the turning electric motor 21, the main control part 60 uses a clockwise turning flag and a counterclockwise turning flag showing that the upper-part turning body 3 is turning clockwise and counterclockwise. The clockwise turning flag shows the presence or absence of the "forward rotation," or the counterclockwise rotation of the rotation shaft 21a of the turning electric motor 21, and the counterclockwise turning flag shows the presence or absence of the "reverse rotation," or the clockwise rotation of the rotation shaft 21a of the turning electric motor 21.

Further, the main control part 60 includes a timer for counting elapsed time in steps S223 through S225 and S233 through S235 to be described below.

The process illustrated in FIG. 9 starts at (1), and the process of step S200 is first executed.

The main control part 60 determines whether the value of a speed command is positive (step S200). The speed command is input to the main control part 60 from the speed command conversion part 31. Therefore, this process is a process executed by determining whether the value of the speed command input to the main control part 60 from the speed command conversion part 31 is positive.

If determining that the value of the speed command is positive, the main control part 60 sets both the clockwise turning flag and the counterclockwise turning flag to "0" (step S201). This is for resetting both flags.

Next, the main control part 60 determines whether a rotation speed is positive (step S202). If determining that the rotation speed is positive, the main control part 60 sets the clockwise turning flag to "1" and sets the counterclockwise turning flag to "0" (step S203). This is because in this case, the rotation shaft 21a of the turning electric motor 21 is in forward rotation so that the upper-part turning body 3 is turning clockwise.

Further, the main control part 60 causes the turning drive control unit 40 to control the driving of the turning electric motor 21 in accordance with the speed command output from the speed command conversion part 31 (step S250). Thereby, the upper-part turning body 3 is caused to turn clockwise.

In the case of determining that the rotation speed is not positive in step S202 as well, the procedure proceeds to step S250, and the main control part 60 causes the turning drive control unit 40 to control the driving of the turning electric motor 21 in accordance with the speed command output from the speed command conversion part 31 (step S250). This is the case where the rotation speed of the rotation shaft 21a of the turning electric motor 21 is zero or negative although a speed command for forward rotation has been output from the speed command conversion part 31, and specifically, corresponds to the case where the upper-part turning body 3 is stationary or being caused to turn counterclockwise by an external force although the operation lever 26A is being operated in the direction of clockwise turning.

When the above process ends, the procedure returns to (1).

If determining in step S200 that the speed command is not positive, the main control part 60 determines whether the speed command is negative (step S210). The speed command is input to the main control part 60 from the speed command conversion part 31. Therefore, this process is a process executed by determining whether the value of the speed command input to the main control part 60 from the speed command conversion part 31 is negative.

If determining that the value of the speed command is negative, the main control part 60 sets both the clockwise turning flag and the counterclockwise turning flag to "0" (step S211). This is for resetting both flags.

Next, the main control part 60 determines whether a rotation speed is negative (step S212). If determining that the rotation speed is negative, the main control part 60 sets the clockwise turning flag to "0" and sets the counterclockwise turning flag to "1" (step S213). This is because in this case, the rotation shaft 21a of the turning electric motor 21 is in reverse rotation so that the upper-part turning body 3 is turning counterclockwise.

Further, the main control part 60 causes the turning drive control unit 40 to control the driving of the turning electric motor 21 in accordance with the speed command output from the speed command conversion part 31 (step S250). Thereby, the upper-part turning body 3 is caused to turn counterclockwise.

In the case of determining that the rotation speed is not negative in step S212 as well, the procedure proceeds to step S250, and the main control part 60 causes the turning drive control unit 40 to control the driving of the turning electric motor 21 in accordance with the speed command output from the speed command conversion part 31 (step S250). This is the case where the rotation speed of the rotation shaft 21a of the turning electric motor 21 is zero or positive although a speed command for reverse rotation has been output from the speed command conversion part 31, and specifically, corresponds to the case where the upper-part turning body 3 is stationary or being caused to turn clockwise by an external force although the operation lever 26A is being operated in the direction of counterclockwise turning.

When the above process ends, the procedure returns to (1).

If determining in step S210 that the speed command is not negative, the main control part 60 determines whether the clockwise turning flag is "1" (step S220). This is for determining whether the upper-part turning body 3 is turning clockwise (the rotation shaft 21a of the turning electric motor 21 is in forward rotation) with the speed command being zero. This corresponds to, for example, the case where the amount of operation of the lever 26A is in the zero speed command region in order to come to a stop from a clockwise turning state.

Next, the main control part 60 determines whether a rotation speed is lower than a predetermined set speed (S221). The predetermined set speed is extremely low, and is set to, for example, a 5% speed. This is for determining whether the state is immediately before a stop of rotation. The 5% speed is a rotation speed in the case of the highest turning speed being a 100% speed.

If determining that the rotation speed is lower than the set speed, the main control part 60 stops the inverter 20 (step S222). This is for causing a braking torque immediately before a stop of rotation to be smaller than before the time immediately before the stop of rotation by freeing the rotation shaft 21a by causing a torque current command value for driving the turning electric motor 21 to be zero in the case of determining that the rotation is immediately before coming to a stop.

If determining that the rotation speed is lower than the set speed, the main control part 60 sets a timer (step S223). This is for preparing for counting elapsed time. Here, the timer is set to 0.1 seconds.

Next, the main control part 60 starts counting elapsed time with the timer (step S224). This is for making a determination for returning the allowable value of the torque limiting part 54 based on the elapsed time.

The main control part 60 determines whether the counting is up (step S225). This process of step S225 is repeatedly performed until it is determined that the counting is up.

Next, the main control part 60 sets the clockwise turning flag to "0" (step S226). This is because it is believed that the rotation shaft 21a has come to a stop with the rotational resistance of the turning mechanism 2 and the turning electric motor 21 as a result of freeing the rotation shaft 21a by stopping the inverter 20 for driving the turning electric motor 21 only for 0.1 seconds.

Further, the main control part 60 causes the turning drive control unit 40 to control the driving of the turning electric motor 21 in accordance with the speed command output from the speed command conversion part 31 (step S250). At this point, the speed command is a zero speed command. Therefore, a braking torque is applied on the rotation shaft 21a of the turning electric motor 21, so that the rotation speed of the rotation shaft 21a is controlled to be zero. Thereby, the upper-part turning body 3 is stopped. Therefore, the mechanical brake 23 is put into operation, so that the upper-part turning body 3 is kept stationary.

In the case of determining that the rotation speed is not less than the set speed in step S221 as well, the procedure proceeds to step S250, and the main control part 60 causes the turning drive control unit 40 to control the driving of the turning electric motor 21 in accordance with the speed command output from the speed command conversion part 31 (step S250). This is the state where a zero speed command has been output from the speed command conversion part 31 so that a braking torque is applied on the rotation shaft 21a of the turning electric motor 21 while the rotation speed during the clockwise turning is more than or equal to the set value. This corresponds to such a time as is immediately after a release of the lever 26A during the clockwise turning.

When the above process ends, the procedure returns to (1).

If determining in step S220 that the clockwise turning flag is not "1," the main control part 60 determines whether the counterclockwise turning flag is "1" (step S230). This is for determining whether the upper-part turning body 3 is turning counterclockwise (the rotation shaft 21a of the turning electric motor 21 is in reverse rotation) with the speed command being zero. This corresponds to, for example, the case where the amount of operation of the lever 26A is in the zero speed command region in order to come to a stop from a counterclockwise turning state.

Next, the main control part 60 determines whether a rotation speed is higher than a predetermined negative set speed (S231). The predetermined set speed is extremely low, and is set to, for example, a −5% speed. This is for determining whether the state is immediately before a stop of rotation. The −5% speed is a rotation speed in the case of the highest turning speed in the reverse rotation direction being a −100% speed.

If determining that the rotation speed is higher than the predetermined negative set speed, the main control part 60 causes the allowable value of the torque limiting part 54 to be zero (step S232). This is for causing a braking torque immediately before a stop of rotation to be smaller than before the time immediately before the stop of rotation by freeing the rotation shaft 21a by causing a torque current command value for driving the turning electric motor 21 to be zero in the case of determining that the rotation is immediately before coming to a stop.

If determining that the rotation speed is higher than the predetermined negative set speed, the main control part 60 sets a timer (step S233). This is for preparing for counting elapsed time. Here, the timer is set to 0.1 seconds.

Next, the main control part 60 starts a countdown of elapsed time with the timer (step S234). This is for counting elapsed time.

The main control part 60 determines whether the counting is up (step S235). This process of step S235 is repeatedly performed until it is determined that the counting is up.

Next, the main control part 60 sets the counterclockwise turning flag to "0" (step S236). This is because it is believed that the rotation shaft 21*a* has come to a stop with the rotational resistance of the turning mechanism 2 and the turning electric motor 21 as a result of freeing the rotation shaft 21*a* by stopping the inverter 20 for driving the turning electric motor 21 only for 0.1 seconds.

Further, the main control part 60 causes the turning drive control unit 40 to control the driving of the turning electric motor 21 in accordance with the speed command output from the speed command conversion part 31 (step S250). At this point, the speed command is a zero speed command. Therefore, a braking torque is applied on the rotation shaft 21*a* of the turning electric motor 21, so that the rotation speed of the rotation shaft 21*a* is controlled to be zero. Thereby, the upper-part turning body 3 is stopped. Therefore, the mechanical brake 23 is put into operation, so that the upper-part turning body 3 is kept stationary.

If it is determined in step S230 that the counterclockwise turning flag is not "1," the procedure proceeds to step S250, and the main control part 60 causes the turning drive control unit 40 to control the driving of the turning electric motor 21 in accordance with the speed command output from the speed command conversion part 31 (step S250). This is for causing a stopped state due to a zero speed command or a stopped state due to the mechanical brake 23 to be kept by the drive control of the turning drive control unit 40 because turning is stopped.

In the case of determining that the rotation speed is not higher than the predetermined negative set speed in step S231 as well, the procedure proceeds to step S250, and the main control part 60 causes the turning drive control unit 40 to control the driving of the turning electric motor 21 in accordance with the speed command output from the speed command conversion part 31 (step S250). This is the state where a zero speed command has been output from the speed command conversion part 31 so that a braking torque is applied on the rotation shaft 21*a* of the turning electric motor 21 while the rotation speed during the counterclockwise turning is less than or equal to the set value. This corresponds to such a time as is immediately after a release of the lever 26A during the counterclockwise turning.

When the above process ends, the procedure returns to (1).

[Description of Operation]

Figure 10:
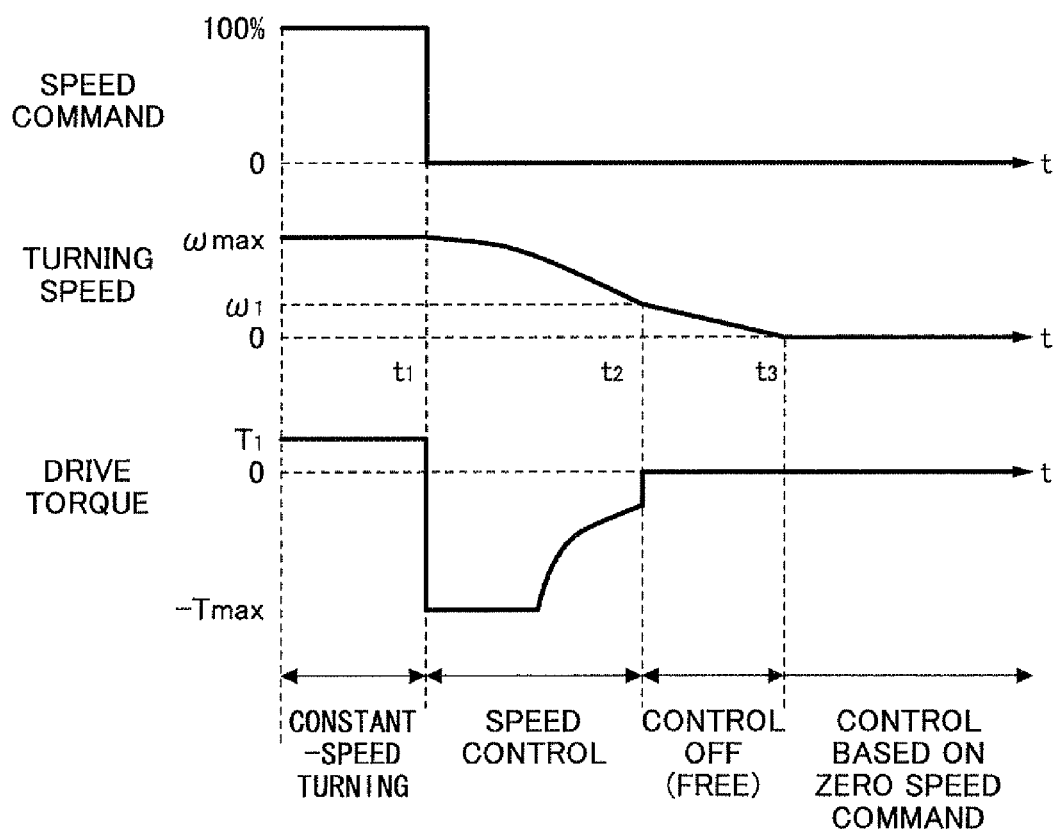
FIG. 10 is a characteristics chart for illustrating an operation at a time when turning is stopped by the drive control of the turning drive control unit 40 of the second embodiment.

FIG. 10 is a characteristics chart for illustrating an operation at a time when turning is stopped by the drive control of the turning drive control unit 40 of the second embodiment. These characteristics indicate temporal changes in a speed command, a turning speed, and a drive torque (braking torque) at a time when the upper-part turning body 3 comes to a stop from a clockwise turning state.

It is assumed that at time t=0, a turning operation input to the lever 26A of the operation apparatus 26 is a maximum amount in the clockwise direction, a 100% speed command is output from the speed command conversion part 31, the turning speed is a maximum speed (max (rad/s) in the clockwise turning direction, and the drive torque is T1 (N·m), which is 20% of a maximum drive torque $T_{max}$.

The state of constant speed turning like this continues until time t=t1, and the upper-part turning body 3 is turning clockwise at constant speed. This state is realized by the drive control process by step S250 illustrated in FIG. 9.

At time t=t1, when the lever 26A is returned to a neutral position, the speed command output from the speed command conversion part 31 becomes 0%, so that feedback control is performed based on a deviation between the speed command and the rotation speed. Therefore, the drive torque becomes a reverse-side maximum value "−Tmax" (that is, the braking torque at the time of clockwise direction turning is maximized), so that the turning speed gradually decreases from (max. With a decrease in the turning speed, the braking torque is gradually reduced from the maximum value (−Tmax). This state is realized by the drive control step by step S250 illustrated in FIG. 9.

At time t=t2, when the turning speed is reduced to a predetermined set value ω1, the main control part 60 turns off drive control of the turning electric motor 21. Thereby, the rotation speed of the rotation shaft 21*a* (turning speed) gradually decreases with the rotational resistance of the turning electric motor 21 and the turning mechanism 2. This state is realized by the drive control process by step S222 illustrated in FIG. 9.

Further, at time t=t2, the main control part 60 sets a timer and starts a countdown. This state is realized by the process by steps S223 and S224 illustrated in FIG. 9.

At time t=t3, when the counting is up in the main control part 60, the main control part 60 causes the turning drive control unit 40 to execute drive control based on a zero speed command. This is realized by the process by steps S225, S226, and S250 illustrated in FIG. 9.

Thereby, according to the turning drive control unit 40 of the second embodiment, by turning off drive control of the driving of the turning electric motor 21 for an extremely short period of time (here, 0.1 seconds) immediately before a stop of rotation, it is possible to gradually reduce the rotation speed of the rotation shaft 21*a* and stop the rotation shaft 21*a* with the rotational resistance of the turning electric motor 21 and the turning mechanism 2. The rotational resistance force applied on the rotation shaft 21*a* at the time of this stop is extremely small and its temporal change is slow compared with the braking torque applied on the rotation shaft 21*a* by drive control based on a speed command without turning off the drive control as in the conventional way. Therefore, it is possible to cause the braking torque of the turning electric motor 21 to be smaller than before the time immediately before the stop of rotation. Thereby, it is possible to provide a turning drive control unit and a construction machine capable of achieving a good, smooth ride at the time of a stop of rotation with the occurrence of impact due to teeth hitting due to the backlash of the turning mechanism 2 being controlled. Further, since it is possible to control teeth hitting due to the backlash of the turning mechanism 2, it is possible to prolong the useful service life of the turning mechanism 2.

Here, a description is given above of an operation in the case of the upper-part turning body 3 coming to a stop from a clockwise turning state. An operation in the case of the upper-part turning body 3 coming to a stop from a counterclockwise turning state is only different in the sign of the amount of control and is on the same operation principle. Accordingly, a description thereof is omitted.

Third Embodiment

The turning drive control unit 40 of a third embodiment is configured to be capable of changing an allowable value input to the torque limiting part 54, but otherwise, is based on the turning drive control unit 40 of the second embodiment in configuration. Therefore, the same components are given the same characters referring to FIG. 8, and their description is omitted.

The main control part 60 of the third embodiment causes the value of a torque current command to be a 20% value of its maximum value for a predetermined short period of time immediately before stopping the rotation shaft 21a of the turning electric motor 21. A description is given below of a procedure using FIG. 11.

Figure 11:
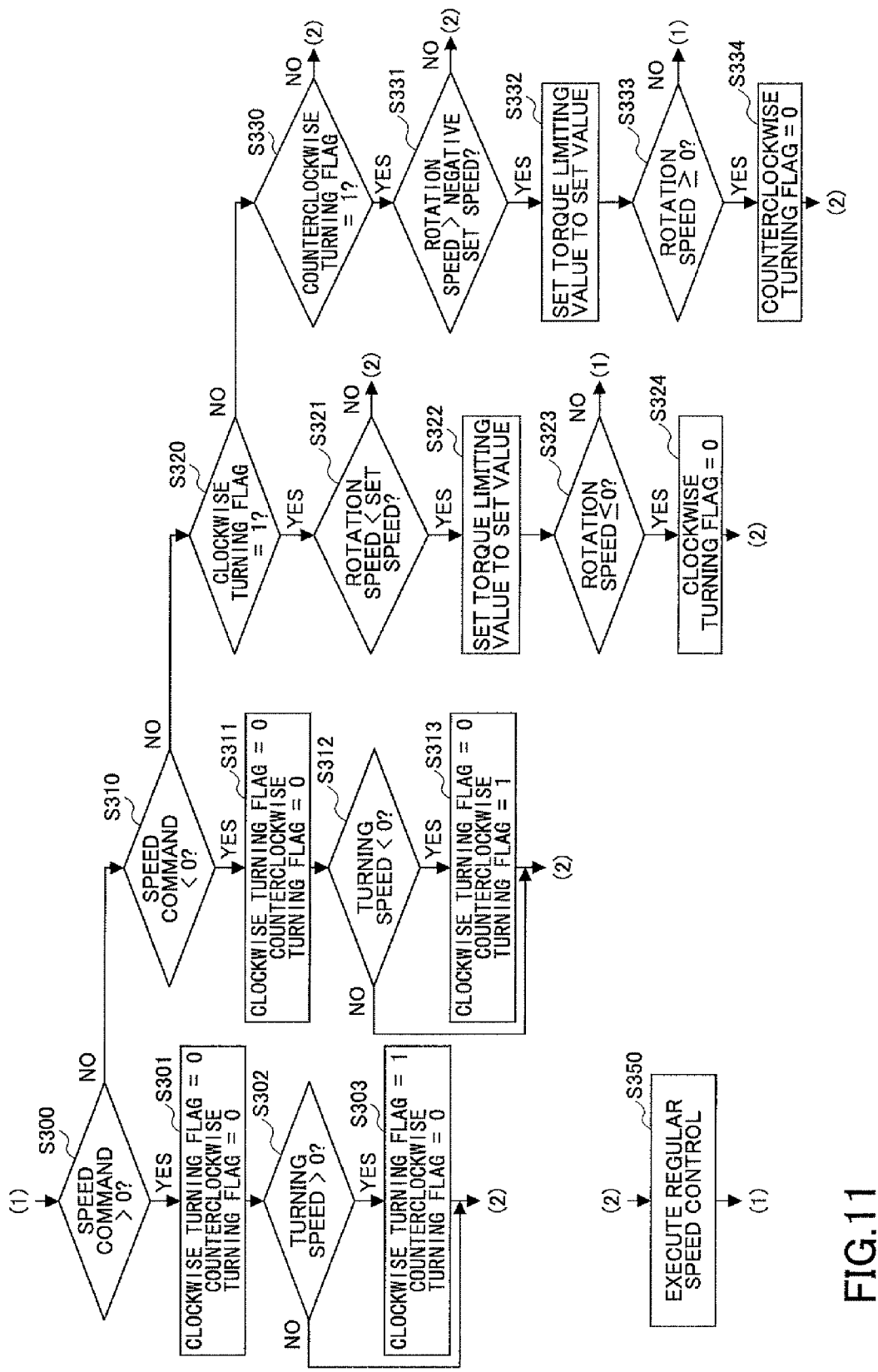
FIG. 11 is a chart illustrating a procedure for controlling the driving of the turning electric motor 21 by the main control part 60 of the turning drive control unit 40 of a third embodiment.

FIG. 11 is a chart illustrating a procedure for controlling the driving of the turning electric motor 21 by the main control part 60 of the turning drive control unit 40 of the third embodiment.

In this process, in controlling the driving of the turning electric motor 21, the main control part 60 uses a clockwise turning flag and a counterclockwise turning flag showing that the upper-part turning body 3 is turning clockwise and counterclockwise. The clockwise turning flag shows the presence or absence of the "forward rotation," or the counterclockwise rotation of the rotation shaft 21a of the turning electric motor 21, and the counterclockwise turning flag shows the presence or absence of the "reverse rotation," or the clockwise rotation of the rotation shaft 21a of the turning electric motor 21.

The process illustrated in FIG. 11 starts at (1), and the process of step S300 is first executed.

The main control part 60 determines whether the value of a speed command is positive (step S300). The speed command is input to the main control part 60 from the speed command conversion part 31. Therefore, this process is a process executed by determining whether the value of the speed command input to the main control part 60 from the speed command conversion part 31 is positive.

If determining that the value of the speed command is positive, the main control part 60 sets both the clockwise turning flag and the counterclockwise turning flag to "0" (step S301). This is for resetting both flags.

Next, the main control part 60 determines whether a rotation speed is positive (step S302). If determining that the rotation speed is positive, the main control part 60 sets the clockwise turning flag to "1" and sets the counterclockwise turning flag to "0" (step S303). This is because in this case, the rotation shaft 21a of the turning electric motor 21 is in forward rotation so that the upper-part turning body 3 is turning clockwise.

Further, the main control part 60 causes the turning drive control unit 40 to control the driving of the turning electric motor 21 in accordance with the speed command output from the speed command conversion part 31 (step S350). Thereby, the upper-part turning body 3 is caused to turn clockwise.

In the case of determining that the rotation speed is not positive in step S302 as well, the procedure proceeds to step S350, and the main control part 60 causes the turning drive control unit 40 to control the driving of the turning electric motor 21 in accordance with the speed command output from the speed command conversion part 31 (step S350). This is the case where the rotation speed of the rotation shaft 21a of the turning electric motor 21 is zero or negative although a speed command for forward rotation has been output from the speed command conversion part 31, and specifically, corresponds to the case where the upper-part turning body 3 is stationary or being caused to turn counterclockwise by an external force although the operation lever 26A is being operated in the direction of clockwise turning.

When the above process ends, the procedure returns to (1).

If determining in step S300 that the speed command is not positive, the main control part 60 determines whether the speed command is negative (step S310). The speed command is input to the main control part 60 from the speed command conversion part 31. Therefore, this process is a process executed by determining whether the value of the speed command input to the main control part 60 from the speed command conversion part 31 is negative.

If determining that the value of the speed command is negative, the main control part 60 sets both the clockwise turning flag and the counterclockwise turning flag to "0" (step S311). This is for resetting both flags.

Next, the main control part 60 determines whether a rotation speed is negative (step S312). If determining that the rotation speed is negative, the main control part 60 sets the clockwise turning flag to "0" and sets the counterclockwise turning flag to "1" (step S313). This is because in this case, the rotation shaft 21a of the turning electric motor 21 is in reverse rotation so that the upper-part turning body 3 is turning counterclockwise.

Further, the main control part 60 causes the turning drive control unit 40 to control the driving of the turning electric motor 21 in accordance with the speed command output from the speed command conversion part 31 (step S350). Thereby, the upper-part turning body 3 is caused to turn counterclockwise.

In the case of determining that the rotation speed is not negative in step S312 as well, the procedure proceeds to step S350, and the main control part 60 causes the turning drive control unit 40 to control the driving of the turning electric motor 21 in accordance with the speed command output from the speed command conversion part 31 (step S350). This is the case where the rotation speed of the rotation shaft 21a of the turning electric motor 21 is zero or positive although a speed command for reverse rotation has been output from the speed command conversion part 31, and specifically, corresponds to the case where the upper-part turning body 3 is stationary or being caused to turn clockwise by an external force although the operation lever 26A is being operated in the direction of counterclockwise turning.

When the above process ends, the procedure returns to (1).

If determining in step S310 that the speed command is not negative, the main control part 60 determines whether the clockwise turning flag is "1" (step S320). This is for determining whether the upper-part turning body 3 is turning clockwise (the rotation shaft 21a of the turning electric motor 21 is in forward rotation) with the speed command being zero. This corresponds to, for example, the case where the amount of operation of the lever 26A is in the zero speed command region in order to come to a stop from a clockwise turning state.

Next, the main control part 60 determines whether a rotation speed is lower than a predetermined set speed (S321). The predetermined set speed is extremely low, and is set to, for example, a 10% speed. This is for determining whether the state is immediately before a stop of rotation. The 10% speed is a rotation speed in the case of the highest turning speed being a 100% speed.

If determining that the rotation speed is lower than the set speed, the main control part 60 causes the allowable value of the torque limiting part 54 to be value T2, which is 20% of the maximum allowable value (step S322). This is for causing a braking torque immediately before a stop of rotation to be smaller than before the time immediately before the stop of rotation by reducing a torque current command value for driving the turning electric motor 21 in the case of determining that the rotation is immediately before coming to a stop.

Next, the main control part 60 determines whether or not the rotation speed is less than or equal to zero (step S323). This is for determining whether or not the rotation shaft 21a has stopped or reversed.

If determining that the rotation speed is less than or equal to zero, the main control part 60 sets the clockwise turning flag to "0" (step S324). This is because the turning electric motor 21 has stopped.

Further, the main control part 60 causes the turning drive control unit 40 to control the driving of the turning electric motor 21 in accordance with the speed command output from the speed command conversion part 31 (step S350). At this point, the speed command is a zero speed command. Therefore, a braking torque is applied on the rotation shaft 21a of the turning electric motor 21, so that the rotation speed of the rotation shaft 21a is controlled to be zero. Thereby, the upper-part turning body 3 is stopped. Therefore, the mechanical brake 23 is put into operation, so that the upper-part turning body 3 is kept stationary.

In the case of determining that the rotation speed is not less than the set speed in step S321 as well, the procedure proceeds to step S350, and the main control part 60 causes the turning drive control unit 40 to control the driving of the turning electric motor 21 in accordance with the speed command output from the speed command conversion part 31 (step S350). This is the state where a zero speed command has been output from the speed command conversion part 31 so that a braking torque is applied on the rotation shaft 21a of the turning electric motor 21 while the rotation speed during the clockwise turning is more than or equal to the set value. This corresponds to such a time as is immediately after a release of the lever 26A during the clockwise turning.

Further, if it is determined in step S323 that the rotation speed is not less than or equal to zero (that is, the rotation speed is positive), the procedure proceeds to step S300, and the procedure is repeatedly performed.

When the above process ends, the procedure returns to (1) (step S300).

If determining in step S320 that the clockwise turning flag is not "1," the main control part 60 determines whether the counterclockwise turning flag is "1" (step S330). This is for determining whether the upper-part turning body 3 is turning counterclockwise (the rotation shaft 21a of the turning electric motor 21 is in reverse rotation) with the speed command being zero. This corresponds to, for example, the case where the amount of operation of the lever 26A is in the zero speed command region in order to come to a stop from a counterclockwise turning state.

Next, the main control part 60 determines whether a rotation speed is higher than a predetermined negative set speed (S331). The predetermined set speed is extremely low, and is set to, for example, a −10% speed. This is for determining whether the state is immediately before a stop of rotation. The −10% speed is a rotation speed in the case of the highest turning speed in the reverse rotation direction being a −100% speed.

If determining that the rotation speed is higher than the predetermined negative set speed, the main control part 60 causes the allowable value of the torque limiting part 54 to be value T2, which is 20% of the maximum allowable value (step S332). This is for causing a braking torque immediately before a stop of rotation to be smaller than before the time immediately before the stop of rotation by reducing a torque current command value for driving the turning electric motor 21 in the case of determining that the rotation is immediately before coming to a stop.

Next, the main control part 60 determines whether or not the rotation speed is more than or equal to zero (step S333). This is for determining whether or not the rotation shaft 21a has stopped or reversed.

If determining that the rotation speed is more than or equal to zero, the main control part 60 sets the counterclockwise turning flag to "0" (step S334). This is because the turning electric motor 21 has stopped.

Further, the main control part 60 causes the turning drive control unit 40 to control the driving of the turning electric motor 21 in accordance with the speed command output from the speed command conversion part 31 (step S350). At this point, the speed command is a zero speed command. Therefore, a braking torque is applied on the rotation shaft 21a of the turning electric motor 21, so that the rotation speed of the rotation shaft 21a is controlled to be zero. Thereby, the upper-part turning body 3 is stopped. Therefore, the mechanical brake 23 is put into operation, so that the upper-part turning body 3 is kept stationary.

If it is determined in step S330 that the counterclockwise turning flag is not "1," the procedure proceeds to step S350, and the main control part 60 causes the turning drive control unit 40 to control the driving of the turning electric motor 21 in accordance with the speed command output from the speed command conversion part 31 (step S350). This is for causing a stopped state due to a zero speed command or a stopped state due to the mechanical brake 23 to be kept by the drive control of the turning drive control unit 40 because turning is stopped.

In the case of determining that the rotation speed is not higher than the predetermined negative set speed in step S331 as well, the procedure proceeds to step S350, and the main control part 60 causes the turning drive control unit 40 to control the driving of the turning electric motor 21 in accordance with the speed command output from the speed command conversion part 31 (step S350). This is the state where a zero speed command has been output from the speed command conversion part 31 so that a braking torque is applied on the rotation shaft 21a of the turning electric motor 21 while the rotation speed during the counterclockwise turning is less than or equal to the set value. This corresponds to such a time as is immediately after a release of the lever 26A during the counterclockwise turning.

Further, if it is determined in step S333 that the rotation speed is not more than or equal to zero (that is, the rotation speed is negative), the procedure proceeds to step S300, and the procedure is repeatedly performed.

When the above process ends, the procedure returns to (1) (step S300).

[Description of Operation]

Figure 12:
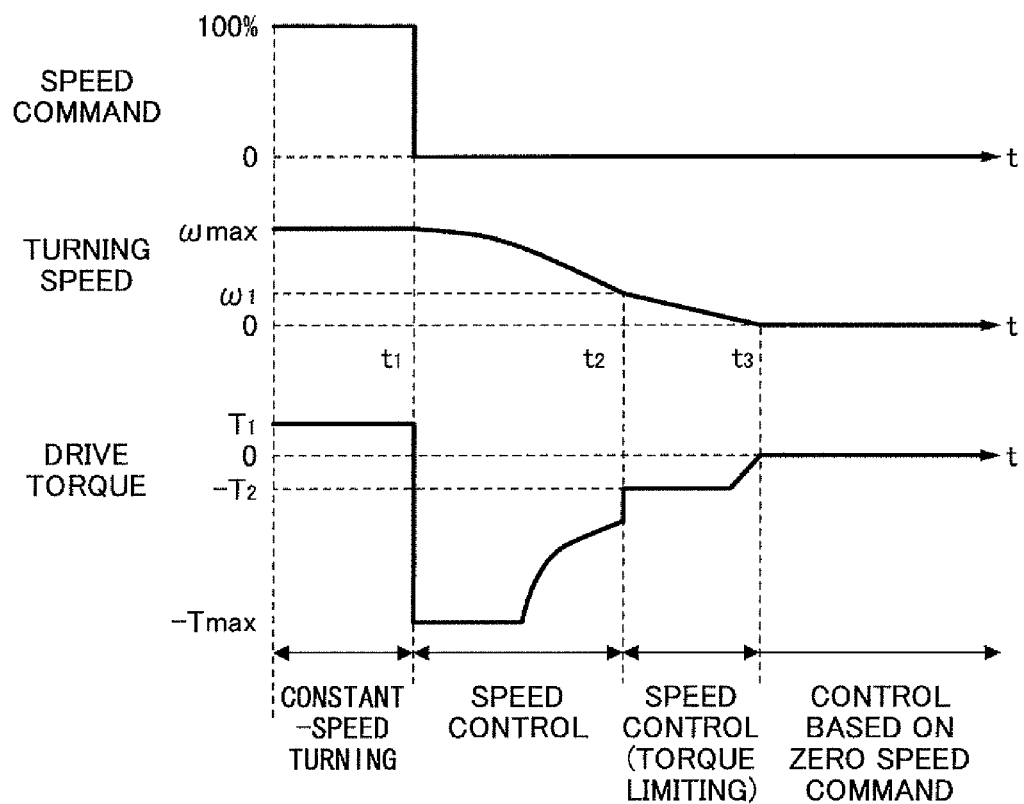
FIG. 12 is a characteristics chart for illustrating an operation at a time when turning is stopped by the drive control of the turning drive control unit 40 of the third embodiment.

FIG. 12 is a characteristics chart for illustrating an operation at a time when turning is stopped by the drive control of the turning drive control unit 40 of the third embodiment. These characteristics indicate temporal changes in a speed command, a turning speed, and a drive torque (braking torque) at a time when the upper-part turning body 3 comes to a stop from a clockwise turning state.

It is assumed that at time t=0, a turning operation input to the lever 26A of the operation apparatus 26 is a maximum amount in the clockwise direction, a 100% speed command is output from the speed command conversion part 31, the turning speed is a maximum speed (max (rad/s) in the clockwise turning direction, and the drive torque is T1 (N·m), which is 20% of a maximum drive torque Tmax.

The state of constant speed turning like this continues until time t=t1, and the upper-part turning body 3 is turning clockwise at constant speed. This state is realized by the drive control process by step S350 illustrated in FIG. 11.

At time t=t1, when the lever 26A is returned to a neutral position, the speed command output from the speed command conversion part 31 becomes 0%, so that feedback control is performed based on a deviation between the speed command and the turning speed. Therefore, the drive torque becomes a reverse-side maximum value "−Tmax" (that is, the braking torque at the time of clockwise direction turning is maximized), so that the turning speed gradually decreases from (max. With a decrease in the turning speed, the braking torque is gradually reduced from the maximum value (−Tmax). This state is realized by the drive control step by step S350 illustrated in FIG. 11.

At time t=t2, when the turning speed is reduced to a predetermined set value ω1, the main control part 60 sets the allowable value of the torque limiting part 54 to "−T2." Thereby, the rotation speed (turning speed) is gradually reduced with a reduced braking torque applied on the rotation shaft 21a of the turning electric motor 21. This state is realized by the drive control process by step S322 illustrated in FIG. 11.

At time t=t3, when the turning speed is made zero by a first regenerative operation, the turning drive control unit 40 is caused to execute drive control based on a zero speed command. This is realized by the process by step S350 illustrated in FIG. 11.

Thereby, according to the turning drive control unit 40 of the third embodiment, it is possible to reduce the braking torque of the turning electric motor 21 immediately before a stop of rotation. The braking torque applied on the rotation shaft 21a at the time of this stop is extremely small and its temporal change is slow compared with the braking torque applied on the rotation shaft 21a by drive control based on a speed command without turning off the drive control as in the conventional way. Therefore, it is possible to provide a turning drive control unit and a construction machine capable of achieving a good, smooth ride at the time of a stop of rotation with the occurrence of impact due to teeth hitting due to the backlash of the turning mechanism 2 being controlled. Further, since it is possible to control teeth hitting due to the backlash of the turning mechanism 2, it is possible to prolong the useful service life of the turning mechanism 2.

Here, a description is given above of an operation in the case of the upper-part turning body 3 coming to a stop from a clockwise turning state. An operation in the case of the upper-part turning body 3 coming to a stop from a counterclockwise turning state is only different in the sign of the amount of control and is on the same operation principle. Accordingly, a description thereof is omitted.

Fourth Embodiment

The turning drive control unit 40 of a fourth embodiment has the same configuration as the turning drive control unit 40 of the second embodiment. Therefore, the same components are given the same characters referring to FIG. 8, and their description is omitted.

The main control part 60 of the fourth embodiment causes a speed command to be a 20% value of its maximum value immediately before stopping the rotation shaft 21a of the turning electric motor 21. A description is given below of a procedure using FIG. 13.

Figure 13:
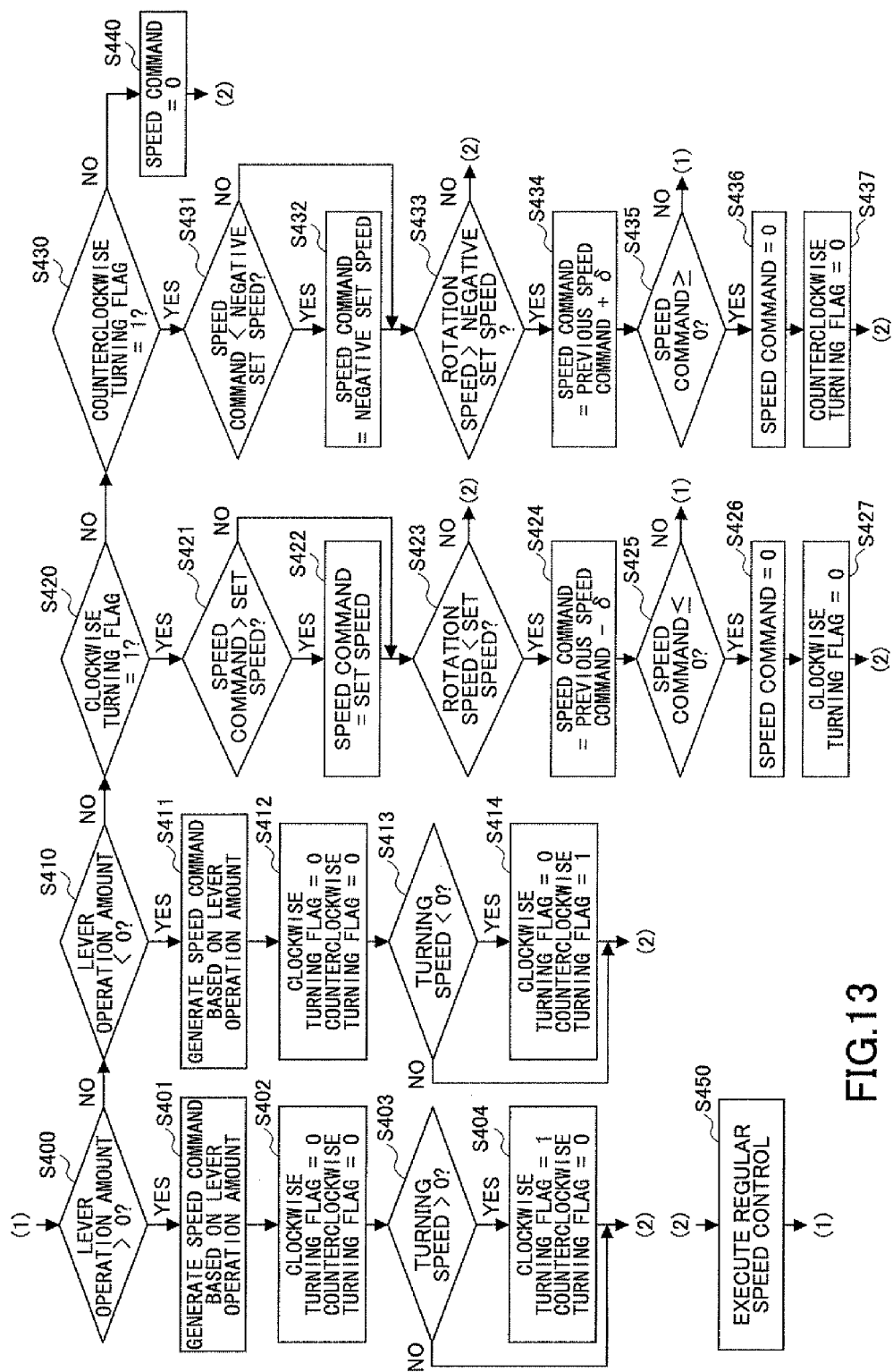
FIG. 13 is a chart illustrating a procedure for controlling the driving of the turning electric motor 21 by the main control part 60 of the turning drive control unit 40 of a fourth embodiment.

FIG. 13 is a chart illustrating a procedure for controlling the driving of the turning electric motor 21 by the main control part 60 of the turning drive control unit 40 of the fourth embodiment.

In this process, in controlling the driving of the turning electric motor 21, the main control part 60 uses a clockwise turning flag and a counterclockwise turning flag showing that the upper-part turning body 3 is turning clockwise and counterclockwise. The clockwise turning flag shows the presence or absence of the "forward rotation," or the counterclockwise rotation of the rotation shaft 21a of the turning electric motor 21, and the counterclockwise turning flag shows the presence or absence of the "reverse rotation," or the clockwise rotation of the rotation shaft 21a of the turning electric motor 21.

The process illustrated in FIG. 13 starts at (1), and the process of step S400 is first executed.

The main control part 60 determines whether the amount of lever operation is positive (step S400). The speed command based on the amount of lever operation is input to the main control part 60 from the speed command conversion part 31. Therefore, this process is a process executed by determining whether the amount of lever operation is positive based on the value of the speed command input to the main control part 60 from the speed command conversion part 31.

If determining that the amount of lever operation is positive, the main control part 60 causes drive control to be executed based on the value of the speed command based on the amount of operation of the lever 26A (step S401).

Next, the main control part 60 sets both the clockwise turning flag and the counterclockwise turning flag to "0" (step S402). This is for resetting both flags.

Next, the main control part 60 determines whether a rotation speed is positive (step S403). If determining that the rotation speed is positive, the main control part 60 sets the clockwise turning flag to "1" and sets the counterclockwise turning flag to "0" (step S404). This is because in this case, the rotation shaft 21a of the turning electric motor 21 is in forward rotation so that the upper-part turning body 3 is turning clockwise.

Further, the main control part 60 causes the turning drive control unit 40 to control the driving of the turning electric motor 21 in accordance with the speed command output from the speed command conversion part 31 (step S450). Thereby, the upper-part turning body 3 is caused to turn clockwise.

In the case of determining that the rotation speed is not positive in step S403 as well, the procedure proceeds to step S450, and the main control part 60 causes the turning drive control unit 40 to control the driving of the turning electric motor 21 in accordance with the speed command output from the speed command conversion part 31 (step S350). This is the case where the rotation speed of the rotation shaft 21a of the turning electric motor 21 is zero or negative although a speed command for forward rotation has been output from the speed command conversion part 31, and specifically, corresponds to the case where the upper-part turning body 3 is stationary or being caused to turn counterclockwise by an external force although the operation lever 26A is being operated in the direction of clockwise turning.

When the above process ends, the procedure returns to (1).

If determining in step S400 that the amount of lever operation is not positive, the main control part 60 determines whether the amount of lever operation is negative (step S410). The speed command based on the amount of lever operation is input to the main control part 60 from the speed command conversion part 31. Therefore, this process is a process executed by determining whether the amount of lever operation is negative based on the value of the speed command input to the main control part 60 from the speed command conversion part 31.

If determining that the amount of lever operation is negative, the main control part 60 causes drive control to be executed based on the value of the speed command based on the amount of operation of the lever 26A (step S411).

Next, the main control part 60 sets both the clockwise turning flag and the counterclockwise turning flag to "0" (step S412). This is for resetting both flags.

Next, the main control part 60 determines whether a rotation speed is negative (step S413). If determining that the rotation speed is negative, the main control part 60 sets the clockwise turning flag to "0" and sets the counterclockwise turning flag to "1" (step S414). This is because in this case, the rotation shaft 21*a* of the turning electric motor 21 is in reverse rotation so that the upper-part turning body 3 is turning counterclockwise.

Further, the main control part 60 causes the turning drive control unit 40 to control the driving of the turning electric motor 21 in accordance with the speed command output from the speed command conversion part 31 (step S450). Thereby, the upper-part turning body 3 is caused to turn counterclockwise.

In the case of determining that the rotation speed is not negative in step S413 as well, the procedure proceeds to step S450, and the main control part 60 causes the turning drive control unit 40 to control the driving of the turning electric motor 21 in accordance with the speed command output from the speed command conversion part 31 (step S450). This is the case where the rotation speed of the rotation shaft 21*a* of the turning electric motor 21 is zero or positive although a speed command for reverse rotation has been output from the speed command conversion part 31, and specifically, corresponds to the case where the upper-part turning body 3 is stationary or being caused to turn clockwise by an external force although the operation lever 26A is being operated in the direction of counterclockwise turning.

When the above process ends, the procedure returns to (1).

If determining in step S410 that the speed command is not negative, the main control part 60 determines whether the clockwise turning flag is "1" (step S420). This is for determining whether the upper-part turning body 3 is turning clockwise (the rotation shaft 21*a* of the turning electric motor 21 is in forward rotation) with the speed command being zero. This corresponds to, for example, the case where the amount of operation of the lever 26A is in the zero speed command region in order to come to a stop from a clockwise turning state.

Next, the main control part 60 determines whether a rotation speed (rad/s) represented by the value of the speed command is higher than a predetermined set speed ω1 (step S421).

If the rotation speed (rad/s) represented by the value of the speed command is higher than the predetermined set speed ω1, the value of the speed command is set to value K1 for obtaining the predetermined set speed ω1 (step S422). Thereby, the value of the speed command is reduced.

Next, the main control part 60 determines whether the rotation speed is lower than the predetermined set speed ω1 (S423). The predetermined set speed ω1 is extremely low, and is set to, for example, a 10% speed. This is for determining whether the state is immediately before a stop of rotation. The 10% speed is a rotation speed in the case of the highest turning speed being a 100% speed.

If it is determined in step S421 that the rotation speed (rad/s) represented by the value of the speed command is not higher than the predetermined set speed ω1, the procedure proceeds to step S423.

The main control part 60 sets the value of the speed command to a value that is the previous value of the speed command minus a predetermined value δ (step S424). This previous value of the speed command is the value set in step S422. Therefore, the value of the speed command is further reduced in step S424. The predetermined value δ represents, for example, a 0.1% speed. This predetermined value δ is a value used for gradually reducing the value of the speed command (every time the process is repeated), and may be set to any value.

The main control part 60 determines whether the value of the speed command is less than or equal to zero (step S425). This is for performing monitoring to prevent the value of the speed command from becoming negative (a value representing reverse rotation) since an attempt is being made to put a stop.

If determining that the value of the speed command is less than or equal to zero, the main control part 60 sets the value of the speed command to zero (step S426). This is for stopping the rotation shaft 21*a* by a zero speed command.

The main control part 60 sets the clockwise turning flag to "0" (step S427). This is because the rotation shaft 21*a* is stationary.

When the above process ends, the procedure returns to (1) (step S400).

If it is determined in step S423 that the rotation speed is not lower than the predetermined set speed ω1, the procedure proceeds to step S450. This is for performing deceleration with regular speed-command-based control since the rotation speed is not sufficiently reduced.

Further, if it is determined in step S425 that the value of the speed command is not less than or equal to zero, the procedure returns to (1) (step S400).

If determining in step S420 that the clockwise turning flag is not "1," the main control part 60 determines whether the counterclockwise turning flag is "1" (step S430). This is for determining whether the upper-part turning body 3 is turning counterclockwise (the rotation shaft 21*a* of the turning electric motor 21 is in reverse rotation) with the speed command being zero. This corresponds to, for example, the case where the amount of operation of the lever 26A is in the zero speed command region in order to come to a stop from a counterclockwise turning state.

Next, the main control part 60 determines whether a rotation speed (rad/s) represented by the value of the speed command is lower than a predetermined set speed "−ω1" (step S431).

If the rotation speed (rad/s) represented by the value of the speed command is lower than the predetermined set speed "−ω1," the value of the speed command is set to value "−K1" for obtaining the predetermined set speed "−ω1" (step S432). Thereby, the value of the speed command is reduced.

Next, the main control part 60 determines whether the rotation speed is higher than the predetermined negative set speed "−ω1" (S433). The predetermined negative set speed "−ω1" is extremely low, and is set to, for example, a "−10% speed." This is for determining whether the state is immediately before a stop of rotation. The "−10% speed" is a rotation speed in the case of the highest turning speed in the reverse rotation direction being a "−100% speed".

If it is determined in step S431 that the rotation speed (rad/s) represented by the value of the speed command is not lower than the predetermined negative set speed "−ω1," the procedure proceeds to step S433.

The main control part 60 sets the value of the speed command to a value that is the previous value of the speed command plus a predetermined value δ (step S434). This previous value of the speed command is the value set in step S432. Therefore, the value of the speed command is further increased in step S434. The predetermined value δ represents an increase in speed.

The main control part 60 determines whether the value of the speed command is more than or equal to zero (step S435). This is for performing monitoring to prevent the value of the speed command from becoming positive (a value representing forward rotation) since an attempt is being made to stop.

If determining that the value of the speed command is more than or equal to zero, the main control part 60 sets the value of the speed command to zero (step S436). This is for stopping the rotation shaft 21a by a zero speed command.

The main control part 60 sets the counterclockwise turning flag to "0" (step S437). This is because the rotation shaft 21a is stationary.

When the above process ends, the procedure returns to (1) (step S400).

If it is determined in step S433 that the rotation speed is not higher than the predetermined negative set speed "−ω1," the procedure proceeds to step S450. This is for performing deceleration with regular speed-command-based control since the rotation speed is not sufficiently reduced in absolute value.

Further, if it is determined in step S435 that the value of the speed command is not more than or equal to zero, the procedure returns to (1) (step S400).

When the above process ends, the procedure returns to (1) (step S400).

[Description of Operation]

FIG. 14 is a characteristics chart for illustrating an operation at a time when turning is stopped by the drive control of the turning drive control unit 40 of the fourth embodiment. These characteristics indicate temporal changes in a speed command, a turning speed, and a drive torque (braking torque) at a time when the upper-part turning body 3 comes to a stop from a clockwise turning state.

It is assumed that at time t=0, a turning operation input to the lever 26A of the operation apparatus 26 is a maximum amount in the clockwise direction, a 100% speed command is output from the speed command conversion part 31, the turning speed is a maximum speed max (rad/s) in the clockwise turning direction, and the drive torque is T1 (N·m), which is 20% of a maximum drive torque $T_{max}$.

The state of constant speed turning like this continues until time t=t1, and the upper-part turning body 3 is turning clockwise at constant speed. This state is realized by the drive control process by step S450 illustrated in FIG. 13.

At time t=t1, when the lever 26A is returned to a neutral position, the speed command output from the speed command conversion part 31 becomes the set value K1, so that feedback control is performed based on a deviation between the speed command and the rotation speed. Therefore, the drive torque becomes a reverse-side maximum value "−Tmax" (that is, the braking torque at the time of clockwise direction turning is maximized), so that the turning speed gradually decreases from (max. With a decrease in the turning speed, the braking torque is gradually reduced from the maximum value (−Tmax). This state is realized by the drive control step by step S450 illustrated in FIG. 13.

At time t=t2, when the turning speed is reduced to a predetermined set value ω1, the value of the speed command is gradually reduced from K1. Thereby, the rotation speed (turning speed) is gradually reduced with a reduced braking torque applied on the rotation shaft 21a of the turning electric motor 21. This state is realized by the drive control process by step S424 illustrated in FIG. 13. Between time t2 and time t3, the drive control is based on a speed command whose value is gradually reduced from K1 to zero (zero speed command).

At time t=t3, when the turning speed becomes zero, the turning drive control unit 40 is caused to execute drive control based on a zero speed command. This is realized by the process by step S450 illustrated in FIG. 13.

Thereby, according to the turning drive control unit 40 of the fourth embodiment, immediately before a stop of rotation, it is possible to cause the braking torque of the turning electric motor 21 to be smaller than before the time immediately before the stop of rotation. The braking torque applied on the rotation shaft 21a at the time of this stop is extremely small and its temporal change is slow compared with the braking torque applied on the rotation shaft 21a by drive control based on a speed command without turning off the drive control as in the conventional way. Therefore, it is possible to provide a turning drive control unit and a construction machine capable of achieving a good, smooth ride at the time of a stop of rotation with the occurrence of impact due to teeth hitting due to the backlash of the turning mechanism 2 being controlled. Further, since it is possible to control teeth hitting due to the backlash of the turning mechanism 2, it is possible to prolong the useful service life of the turning mechanism 2.

Here, a description is given above of an operation in the case of the upper-part turning body 3 coming to a stop from a clockwise turning state. An operation in the case of the upper-part turning body 3 coming to a stop from a counterclockwise turning state is only different in the sign of the amount of control and is on the same operation principle. Accordingly, a description thereof is omitted.

The above description is given of the turning drive control units and the construction machine using the same of exemplary embodiments of the present invention. The present invention, however, is not limited to the specifically disclosed embodiments, and variations and modifications may be made without departing from the scope of the claims.

The invention claimed is:

1. A turning drive control unit configured to control driving of a rotation mechanism of a construction machine driven to turn by an electric motor, the turning drive control unit comprising:
    a speed command output part configured to output a speed command driving the electric motor based on an amount of operation input via an operation part of the construction machine;
    a rotation speed detection part configured to detect a rotation speed of the electric motor; and
    a drive command generation part configured to generate a drive command driving the electric motor based on the speed command output from the speed command output part and the rotation speed detected by the rotation speed detection part,
    wherein at a time immediately before a rotation stop of the electric motor, the drive command generation part causes a braking torque of the electric motor to be smaller than before the time immediately before the rotation stop of the electric motor.

2. The turning drive control unit as claimed in claim 1, further comprising:
    an operation control part configured to switch the electric motor to a short-circuited state,
    wherein at the time immediately before the rotation stop of the electric motor, the operation control part causes the braking torque of the electric motor to be smaller than before the time immediately before the rotation stop of the electric motor by switching the electric motor to the short-circuited state.

3. The turning drive control unit as claimed in claim 2, wherein the operation control part is configured to cancel the short-circuited state of the electric motor when the rotation speed detected by the rotation speed detection part becomes zero, and the drive command generation part controls driving of the electric motor based on a zero speed command causing the rotation speed of the electric motor to be zero when the short-circuited state is canceled by the operation control part.

4. The turning drive control unit as claimed in claim 1, further comprising:
a drive control stop part configured to stop controlling driving of the electric motor,
wherein at the time immediately before the rotation stop of the electric motor, the braking torque of the electric motor is caused to be smaller than before the time immediately before the rotation stop of the electric motor by the drive control stop part stopping controlling the driving of the electric motor.

5. The turning drive control unit as claimed in claim 4, wherein the drive control stop part is configured to cancel a stopped state of controlling the driving when the rotation speed detected by the rotation speed detection part becomes zero, and
the drive command generation part controls the driving of the electric motor based on a zero speed command causing the rotation speed of the electric motor to be zero when the rotation speed detected by the rotation speed detection part becomes zero.

6. The turning drive control unit as claimed in claim 1, further comprising:
a limiting part configured to limit a value of the drive command in absolute value so that a drive torque generated in the electric motor by the drive command is less than or equal to an allowable value,
wherein at the time immediately before the rotation stop of the electric motor, the braking torque of the electric motor is caused to be smaller than before the time immediately before the rotation stop of the electric motor by causing the allowable value of the limiting part to be lower than a regular value.

7. The turning drive control unit as claimed in claim 6, wherein the drive command generation part returns the allowable value of the limiting part to the regular value and controls driving of the electric motor based on a zero speed command causing the rotation speed of the electric motor to be zero when the rotation speed detected by the rotation speed detection part becomes zero.

8. The turning drive control unit as claimed in claim 1, wherein when the amount of operation input via the operation part becomes zero so that the drive command generated in the drive command generation part is caused to be zero, the drive command generation part generates the drive command driving the electric motor at a predetermined low speed until the time immediately before the rotation stop of the electric motor, and at the time immediately before the rotation stop of the electric motor, generates the drive command driving the electric motor based on the speed command output from the speed command output part and the rotation speed detected by the rotation speed detection part, thereby causing the braking torque of the electric motor to be smaller than before the time immediately before the rotation stop.

9. The turning drive control unit as claimed in claim 8, wherein the drive command generation part controls driving of the electric motor based on a zero speed command causing the rotation speed of the electric motor to be zero when the rotation speed detected by the rotation speed detection part becomes zero.

10. A construction machine, comprising:
the turning drive control unit as claimed in claim 1.

* * * * *